(12) United States Patent
Gordon et al.

(10) Patent No.: US 7,316,568 B2
(45) Date of Patent: Jan. 8, 2008

(54) CARDIOPULMONARY PATIENT SIMULATOR

(75) Inventors: Michael S. Gordon, Coconut Grove, FL (US); S. Barry Issenberg, Pembroke Pines, FL (US); David Arthur Lawson, Gaston, SC (US)

(73) Assignee: University of Miami, Coral Gables, FL (US)

( * ) Notice: Subject to any disclaimer, the term of this patent is extended or adjusted under 35 U.S.C. 154(b) by 221 days.

(21) Appl. No.: 11/284,093

(22) Filed: Nov. 22, 2005

(65) Prior Publication Data
US 2007/0117077 A1  May 24, 2007

(51) Int. Cl.
*G09B 23/28* (2006.01)
(52) U.S. Cl. .................... 434/262; 434/265
(58) Field of Classification Search ........ 434/262–275, 434/396
See application file for complete search history.

(56) References Cited

U.S. PATENT DOCUMENTS

| | | | |
|---|---|---|---|
| 2,781,611 A | 2/1957 | Bills et al. | |
| 3,154,881 A | 11/1964 | Elwell | |
| 3,520,071 A | * 7/1970 | Clark et al. | .......... 434/265 |
| 3,564,729 A | 2/1971 | Ackerman | |
| 3,662,076 A | 5/1972 | Gordon et al. | |
| 3,665,087 A | 5/1972 | Poylo | |
| 3,736,363 A | 5/1973 | Baessler et al. | |
| 3,927,663 A | 12/1975 | Russell et al. | |
| 3,947,974 A | 4/1976 | Gordon et al. | |
| 4,360,345 A | * 11/1982 | Hon | .............. 434/262 |
| 4,601,665 A | 7/1986 | Messmore | |
| 4,862,897 A | 9/1989 | Eisenberg et al. | |
| 4,893,632 A | 1/1990 | Armington | |
| 4,915,635 A | * 4/1990 | Ingenito et al. | ............. 434/396 |
| 5,046,504 A | 9/1991 | Albert et al. | |
| 6,120,442 A | 9/2000 | Hickey | |
| 6,326,957 B1 | 12/2001 | Nathan et al. | |

(Continued)

OTHER PUBLICATIONS

Howstuffworks, "How Electric Motors Work" [online], [retrieved Aug. 28, 2005]. Retrieved from the Internet<URL: http//electronics.howstuffworks.com/motor.htm/printable>.*

(Continued)

*Primary Examiner*—Robert Pezzuto
*Assistant Examiner*—Kesha Y. Frisby
(74) *Attorney, Agent, or Firm*—DLA Piper US LLP

(57) ABSTRACT

A simulator for simulating a pulse in a manikin comprises a manikin body. The simulator further comprises a first magnet and a second magnet disposed opposite to each other and spaced apart from each other. The first magnet and second magnet comprise two juxtaposed first and second sub-magnets. The first and second juxtaposed sub-magnets in each magnet are oriented substantially in opposite directions. The first magnet and the second magnet are positioned such that the first sub-magnet of the first magnet is oriented substantially in a same direction as the first sub-magnet of the second magnet and such that the second sub-magnet of the first magnet is oriented substantially in a same direction as the second sub-magnet of the second magnet. The transducer further comprises an armature movably disposed between the first and second magnets. The armature comprises a frame and a solenoid wound adjacent a periphery of the frame. The transducer also comprises a rod attached to the frame of the armature. The armature interacts with the manikin body to simulate the pulse.

22 Claims, 27 Drawing Sheets

U.S. PATENT DOCUMENTS

| | | | |
|---|---|---|---|
| 6,529,641 | B1 | 3/2003 | Chakraboty |
| 6,638,073 | B1 * | 10/2003 | Kazimirov et al. ......... 434/272 |
| 2004/0048230 | A1 * | 3/2004 | Alexander et al. .......... 434/262 |
| 2005/0027201 | A1 | 2/2005 | Badilini et al. |
| 2006/0100536 | A1 | 5/2006 | Nagai et al. |

OTHER PUBLICATIONS

A.G. Ramakrishnan and Supratim Saha; ECG Coding by Wavelet—Based Linear Prediction; IEEE Transactions.

M.B. Malarvili, I. Kamarulafizam, S. Hussain, and D. Helmi; Heart Sound Segmentation Algorithm Based on Instantaneous Energy of Electrocardiogram; Computers in Cardiology; Sep. 21-24, 2003; pp. 327-330.

Sucharita Mitra, M. Mitra, and B.B. Chaudhuri; Generation of Digital Time Database from Paper ECG Records and Fourier Transform-based Analysis for Disease Identification; Computers in Biology and Medicine 34 (2004); pp. 551-560.

* cited by examiner

CARDIOPULMONARY PATIENT SIMULATOR

BACKGROUND OF THE INVENTION

1. Field of the invention

The present invention relates to learning aids in general and more particularly to a simulator for simulating a health condition of a patient.

2. Related art

It is common to use various teaching tools to train healthcare students in the examination of a patient and in the diagnosis of various health conditions of the patient. The traditional practice for training healthcare students involves using patients having particular physiological conditions or disorders. However, while such training practice may be helpful to the healthcare student, it is difficult to arrange as it involves the availability of patients with various health disorders at suitable times. Moreover, a repeated examination of a patient by numerous healthcare students may not be advisable for the patient as the comfort and privacy of the patient as well as the condition of the patient should be taken into consideration.

SUMMARY OF THE INVENTION

An aspect of the present invention is to provide a simulator for simulating a pulse in a manikin. The simulator includes a manikin body. The simulator further includes a first magnet and a second magnet disposed opposite to each other and spaced apart from each other. The first magnet and second magnet comprise two juxtaposed first and second sub-magnets. The first and second juxtaposed sub-magnets in each magnet are oriented substantially in opposite directions. The first magnet and the second magnet are positioned such that the first sub-magnet of the first magnet is oriented substantially in a same direction as the first sub-magnet of the second magnet and such that the second sub-magnet of the first magnet is oriented substantially in a same direction as the second sub-magnet of the second magnet. The transducer further comprises an armature movably disposed between the first and second magnets. The armature comprises a frame and a solenoid wound adjacent a periphery of the frame. The transducer also comprises a rod attached to the frame of the armature. The armature interacts with the manikin body to simulate the pulse.

DETAILED DESCRIPTION OF EMBODIMENTS OF THE INVENTION

Figure 1:
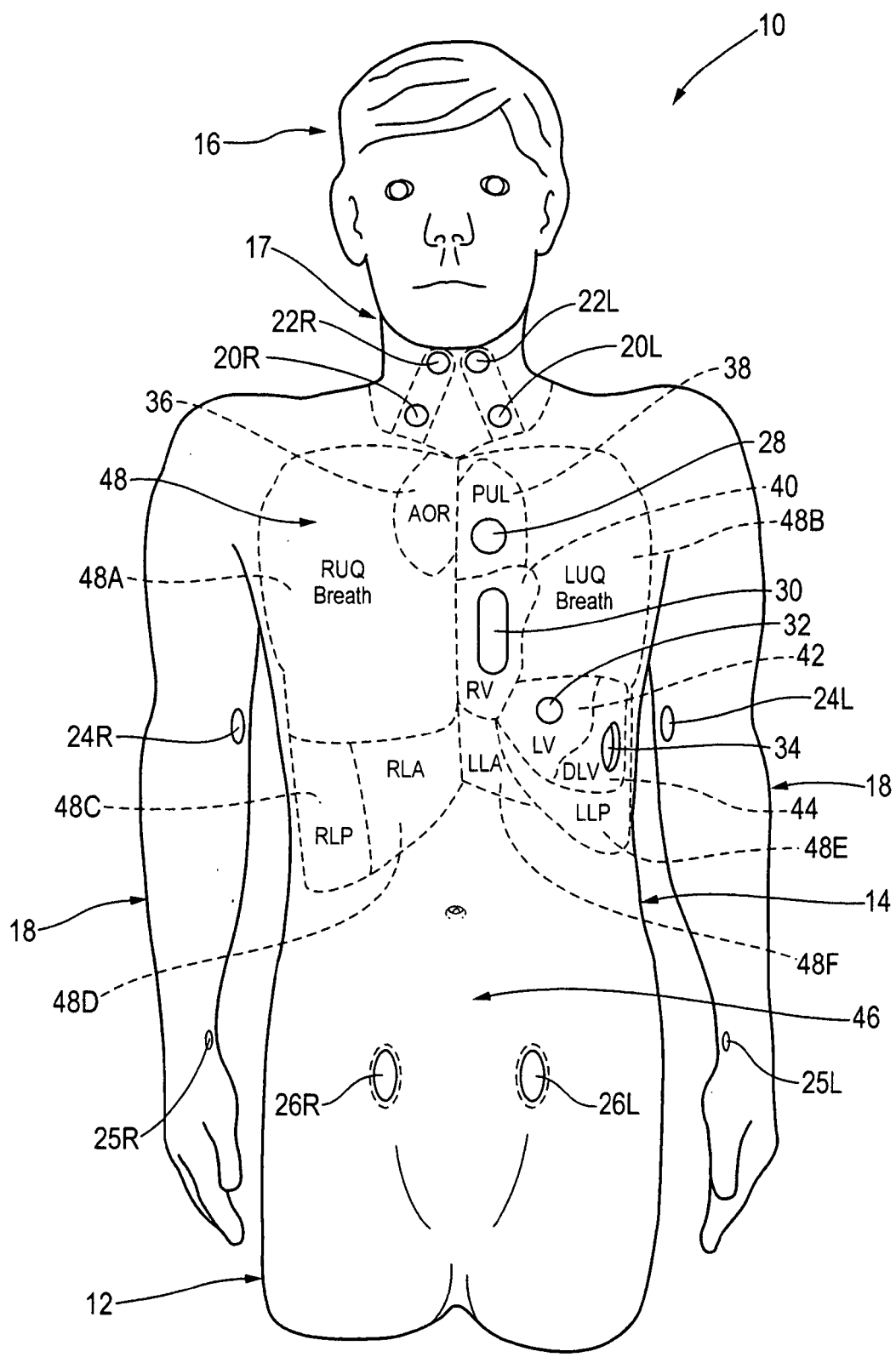
FIG. 1 is a front elevational view of a manikin of a cardiopulmonary patient simulator, according to an embodiment of the present invention.

To enhance the teaching environment for the student, it has been proposed to employ a simulator. The simulator can be configured to simulate certain health conditions to replicate to a certain extent the physiological behavior of a body having the health condition. The simulator, for example, may include a manikin replicating the anatomy of a human body to create a more realistic environment for the student. The simulator can be tailored for a specific category or area of medicine. For example, the simulator can be configured to simulate particular biofunctions of the body such as cardiopulmonary functions of a human body. In this case, the simulator acts as a cardiopulmonary patient simulator (CPS). According to an embodiment of the invention, the CPS is configurable to simulate the bedside findings of a number of cardiac diseases. The CPS may be used for teaching in any environment in which a patient may be examined. Individual students or small groups of students may learn with or without an instructor (for example a medical doctor) by using the CPS. Larger groups of students may also be taught at the CPS bedside or in a lecture hall setting by using one or more speakers to generate heart and lung sounds.

Before describing in detail the CPS, it may be worthwhile to put the CPS in the context of its use as a simulator in teaching, demonstrating, or examining, various cardiac diseases. The approach to examining the CPS is the same as for a real patient. The examination approach is embodied in the "Five Fingers of Clinical Diagnosis" which are history, physical signs, electrocardiograms (ECG), xray, and laboratory diagnostics. The cardiac physical signs of each disease are presented in the CPS according to the "Five Fingers of Physical Signs" which are the physical appearance, the venous pulse, the arterial pulse, the precordial movement and the heart sounds.

The general physical appearance of the CPS is output via a graphical interface of the CPS which is described in more detail in the following paragraphs. The venous pulse is evaluated by inspection of the internal jugular veins which directly reflect right atrial dynamics. The jugular veins are observed (not palpated) as they undulate at the infero-lateral aspect of the sternocleidomastoid muscle. The waveform is assessed by timing its movement with the carotid pulse (which lies higher in the neck just medial to the sternocleidomastoid muscle) or with the heart sounds. A penlight may be used to shine a tangential light beam on the jugular venous pulse to better visualize the venous pulse form.

The carotid arterial pulse is lightly palpated high in the neck just medial of the sternocleidomastoid assessing its upstroke, peak and downstroke. The brachials and femorals can also be examined. The brachial and femoral are palpated simultaneously to detect diminution of delay in the femoral which is a sign of coarctation of the aorta.

Assessment of the arterial pulses includes taking the blood pressure and palpating the pulses. As with a patient, the blood pressure is taken by first palpating the right brachial artery at the medial aspect of the antecubital fossa. A stethoscope is placed over the artery and a cuff inflated. While slowly deflating the cuff and simultaneously listening through the stethoscope, the sphygmomanometer is observed to determine when the Korotkoff sounds begin and end.

The precordial movement is sensed by palpating specific areas of the chest wall. Multiple movements may occur both in systole and diastole. To time the palpable precordial movement, the carotid artery is palpated simultaneously with the precordial movements or the heart sounds are listened to simultaneously with the precordial movements.

Cardiac auscultation usually takes place after having assessed the venous, arterial and chest wall pulsations. However, in some circumstances, cardiac auscultation may take place before observation of venous, arterial and chest wall pulsation or other auscultation. Acoustic events of the heart are analyzed. The auscultatory examination commonly begins at the aortic area and the stethoscope inched to the pulmonary area, tricuspid area and mitral area. In addition, one may listen for posterolateral radiation of mitral murmurs, superior radiation of aortic and pulmonary valve murmurs and carotid bruits. It may also be helpful to simultaneously palpate the carotid to time the acoustic events. Finally, pulmonary auscultation can be performed. Different findings may be present on the left, right, lower (anterior and posterior) and upper fields or areas of the lungs.

The CPS also includes a built-in audio system, for example a wireless audio system, that enables the manikin to function as a patient so that students may practice their communication skills. The instructor is typically located in a nearby room, hears the questions through an audio system and responds through the wireless system in the CPS. Scripts may be developed from the histories provided in the CPS programs which are taken from real-life patient illness histories.

FIG. 1 is a front elevational view of a manikin representing an upper half of a human body from the upper thighs, according to an embodiment of the present invention. The manikin 10 comprises a wall 12 defining a hollow body or cavity 14, a head portion 16 and arms 18. The wall 12 is covered by a resilient layer of material. In an embodiment of the invention, an outer layer of the resilient layer has the texture of human skin. The wall 12 is made of relatively hard materials, such as hard plastics (for example, polypropylene, polyethylene or the like) to simulate a body of a human while the resilient layer is made of relatively soft materials including, for example, polyvinylchloride or polyurethanes, to simulate the human skin.

The manikin includes pulsation positions which include venous pulse in jugular (JUG) positions 20R and 20L, arterial pulse in carotid (C) positions 22R and 22L located in neck 17 of manikin 10, brachial position 24 located in the arm 18 of manikin 10 and femoral artery positions 26R and 26L located in the lower abdomen area, in the upper thighs area, of the manikin 10. Within each area, pulse configurations may be tailored depending on a disease. The manikin may further include sound diagnosis positions.

The manikin further includes precordial movement areas which include a pulmonary area (PUL) 28, located in the upper left sternal edge of the body of the manikin, a right ventricular area (RV) 30, located in the mid and lower left sternal edge of the body of the manikin, left ventricular area (LV) 32, located at the apex-$5^{th}$ left intercostals space, mid-clavicular line, and the displaced left ventricular area (DLV) 34, located at the $6^{th}$ and $7^{th}$ left intercostals space, anterior axillary line. Within each area, multiple movements appropriate for a given disease may be simulated.

The manikin includes cardiac ausculatory areas which include aortic area (AOR) 36, located in the upper right sternal edge of the body, pulmonary area (PUL) 38 located at the upper left sternal edge of the body, tricuspid area (TA) 40, located at the lower left sternal edge), mitral area (MA) 42, located at the apex, mitral radiation (MR) 44, located posterolateral to the apex, the carotids (C) 22R and 22L located on the upper neck 17, the jugular (JUG) 20R and 20L located on the lower part of the neck 17 and the femoral area (FEM) 26R and 26L located at the lower part of the abdomen in the upper part of the thighs.

The manikin is configured to breathe and the breathing movement is simulated by a movement in the abdomen (ABD), generally indicated at 46. With respect to the breathing, the manikin has auscultation positions at walls of a chest portion 48. The pulmonary auscultations areas represented include the right upper quadrant lung field (RUQ) 48A, the left upper quadrant lung field (LUQ) 48B, the right lower posterior lung field (RLP) 48C, right lower anterior lung field (RLA) 48D, left lower posterior lung field (LLP) 48E, and the left lower anterior lung field (LLA) 48F.

In the positions 20R, 20L, 22R, 22L, 24R, 24L, 26R, 26L, 28, 30, 32, 34, 25R and 25L holes are made through the hard wall 12 of the body 14 and arms 18 of the manikin to allow pulsation generators (not shown in this FIGURE) to reach the outer flexible layer representing the skin of the manikin. The pulsation generators, which are described in detail in the following paragraphs, are disposed inside the hollow body 14 of the manikin and are attached to the hard wall 12 of the body 14. The pulsation generators are configured to simulate movements mimicking cardiovascular pulsations and respiratory movements of the human body.

Figure 2:
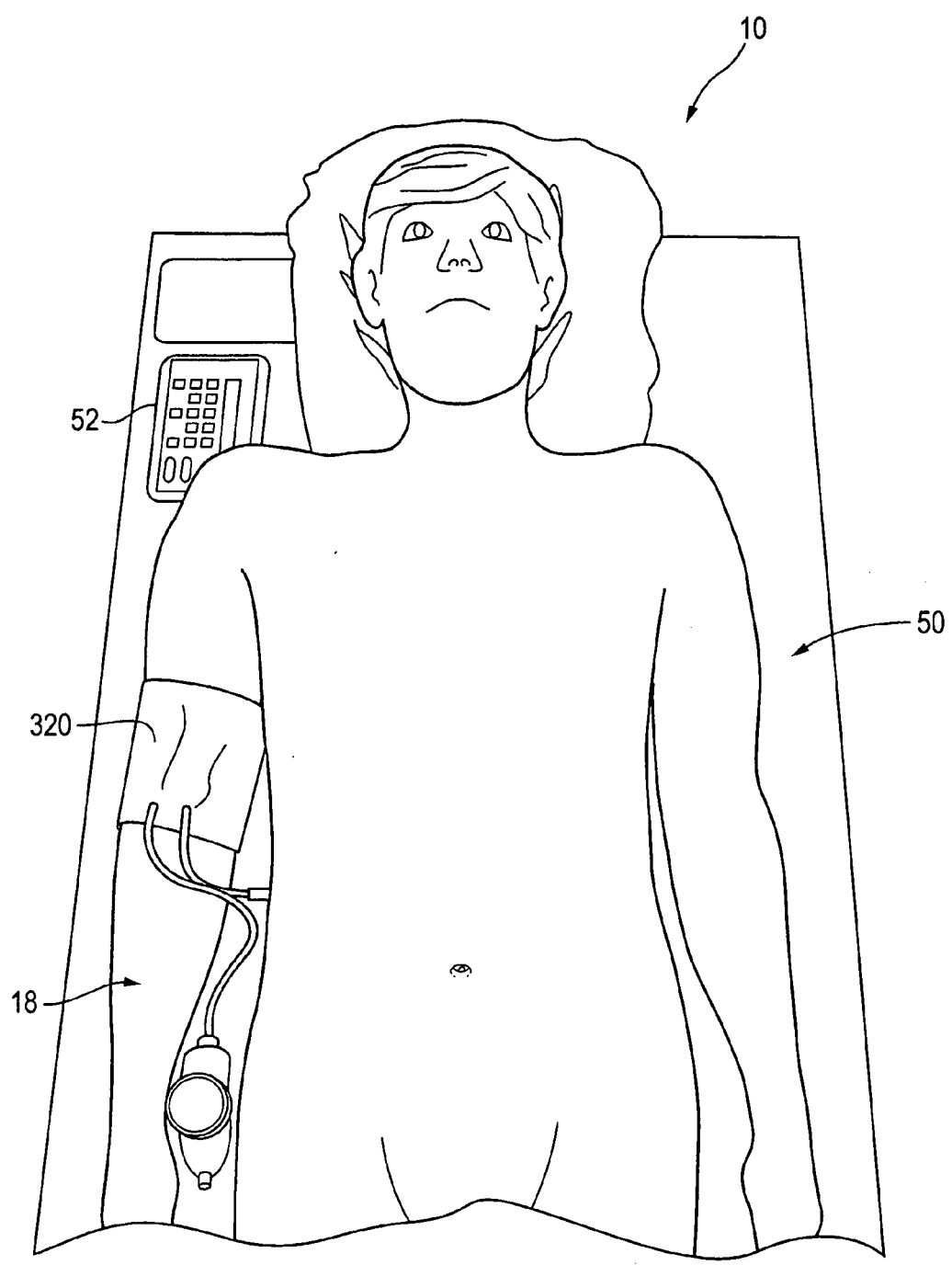
FIG. 2 is an elevational view of the manikin with the manikin laying down on a table top, according to an embodiment of the present invention.

FIG. 2 is an elevational view of the manikin 10 with the manikin laying down on a table top 50. The manikin 10 is supported at a suitable height on the table top 50. The table top 50 includes a housing which houses a controlling device, e.g., a computer (not shown) of the CPS. In operable position, the manikin 10 is laid down on the table top 50 and numerous wires (not shown) connect mechanical and electrical parts (not shown) in the manikin 10 to the controlling device inside the table top 50. The computer or controlling device of the CPS includes an input device or user interface 52 for inputting various physiologic parameters.

Figure 3:
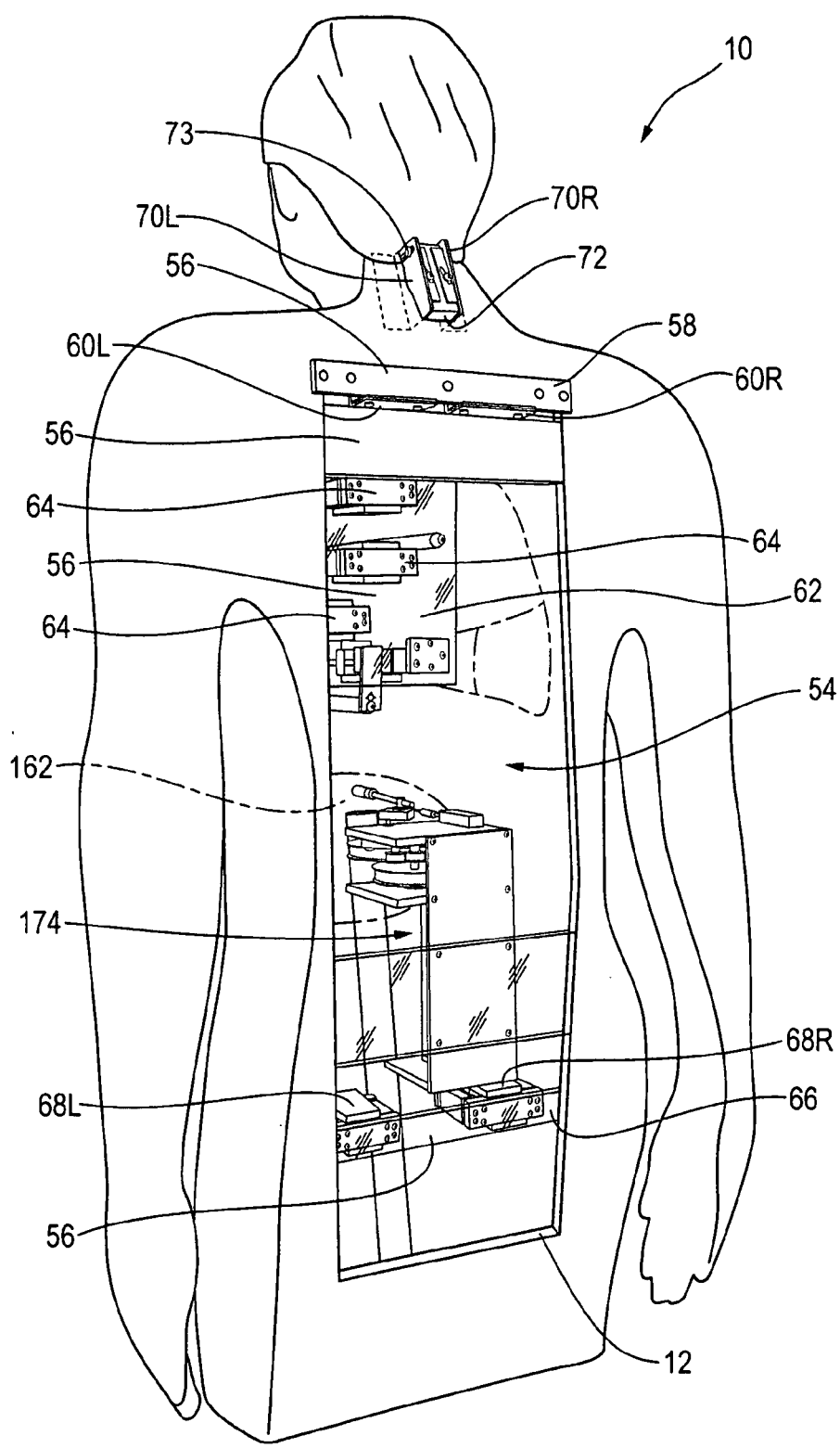
FIG. 3 is a rear elevational view of the manikin shown in FIG. 1.

FIG. 3 is a rear elevational view of the manikin 10. The manikin 10 has an opening 54 through which various mechanical and electrical parts of the CPS are accessed for mounting, adjustment and/or servicing. The manikin 10 comprises a plurality of pulse generators mounted on suitable platforms 56. The platforms 56 can be made of any of a number of suitable materials. In an embodiment of the invention, the platforms are made of plastic as plastic is a dielectric and thus well suited as a base for electrical connections. The plastic can be transparent, translucent or opaque. In an embodiment of the invention, some of the platforms are made of a transparent or translucent plastic to facilitate localization of the various electrical connections.

There are a plurality of platforms 56 in the manikin 10, each platform is configured to support a group of electromagnetic transducers and/or electromechanical parts. Platform or plate 58, a portion of which is shown in FIG. 3, supports transducers that are used to simulate the jugular pulses at areas 20R and 20L (shown in FIG. 1). In an embodiment of the invention, two transducers 59R and 59L (see FIG. 4) are used to simulate the left and right carotid pulses and two transducers 60R and 60L are used to simulate the left and right jugular pulses. Platform 62 supports a plurality of transducers 64 configured to simulate pulmonary artery (PUL) pulse in area 28, right ventricle (RV) pulse in area 30, left ventricle (LV) pulse in area 32 and displaced left ventricle (DLV) pulse in area 34. In an embodiment of the invention, four transducers 64 are used to simulate the pulses in the above regions. However, it must be appreciated that any number of transducers may be used to simulate pulses in various parts of the cardiovascular system. Platform 66 supports transducers 68R and 68L that are configured to simulate the femoral pulses (FEM) in areas 26R and 26L, respectively.

Figure 4:
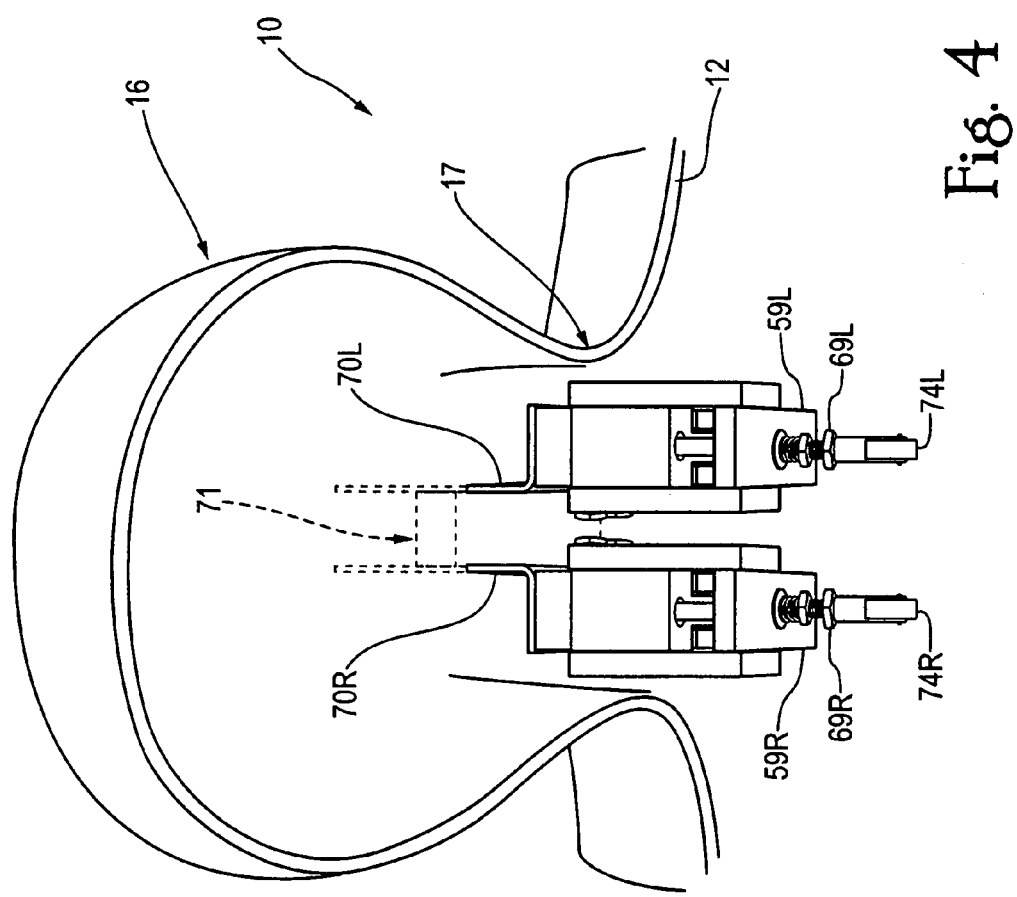
FIG. 4 is a cross-section of the head of the manikin showing the placement of the left and right carotid transducers, according to an embodiment of the present invention.
Figure 5:
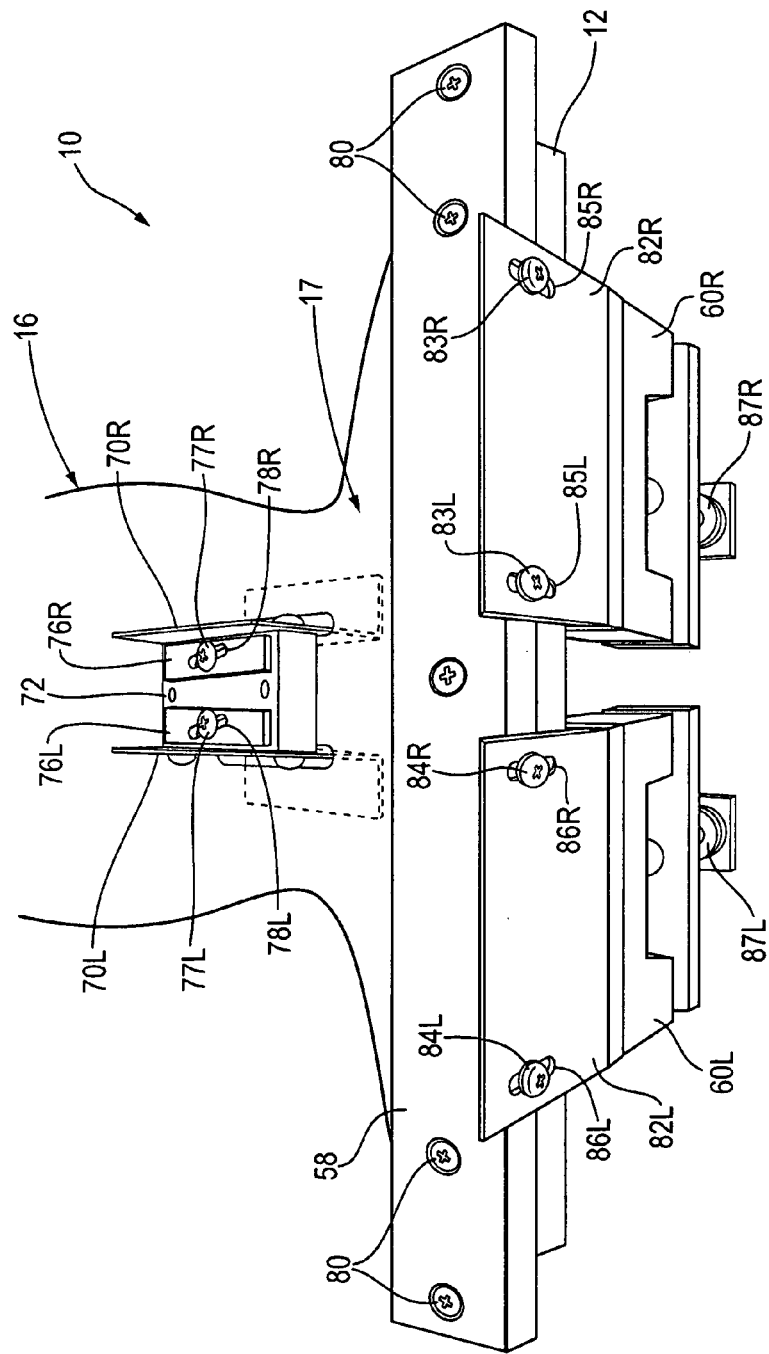
FIG. 5 is a perspective view showing a plate on which jugular transducers are mounted, according to an embodiment of the present invention.

FIG. 4 is a cross section of the head 16 of the manikin 10 showing the placement of the left and right carotid transducers 59R and 59L relative to the head 16 and neck 17 of the manikin 10, according to an embodiment of the present invention. The carotid transducers 59R and 59L are mounted to the wall 12 of the manikin 10 using L-shaped plates 70R and 70L. The L-shaped plates 70R and 70L penetrate through an opening 71 in the wall 12 of the head 16 of the manikin 10. Portions of the plates 70R and 70L are shown in FIG. 4 in dotted lines (phantom lines) to illustrate that the plates 70R and 70L penetrate through the wall 12 of the manikin 10 and cannot be directly seen in the cavity of the head 16. The portions of the plates 70R and 70L shown in FIG. 4 in phantom lines can be seen directly in solid lines in FIG. 5 which is another view showing a back side of the head 16 and in FIG. 3 which is a rear elevational view of the manikin 10. As shown in FIGS. 3 and 5, a flat plate 72 is provided on the back of the neck 17 to link the two plates 70R and 70L and to attach the two plates 70R and 70L to the wall 12 in the back of the neck 17. Fasteners 73, e.g., screws, are used for that purpose.

The plates 70R and 70L are adjustable relative to the wall 12 of the manikin 10. This allows for changing an orientation of the carotid transducers 59R and 59L and associated actuating studs 69R and 69L so that ends of the studs 69R and 69L are positioned in the holes 22R and 22L in the wall 12 of the manikin 10. Each stud 69R and 69L is provided with an end-piece 74R and 74L to prevent damage of the outer layer of skin on which each stud 69R and 69L pushes against with each pulse. In order to adjust the L-shaped plates 70R and 70L relative to the wall 12 of the head 16, two adjustment plates 76R and 76L are provided, as shown in FIG. 5. The adjustment plates 76R and 76L are mounted on the back of the neck 17 onto plate 72 using screws 77R and 77L. Each adjustment plate 76R and 76L has an elongated diagonal opening 78R and 78L, respectively. The screws 77R and 77L are inserted through the diagonal openings 78R and 77L, respectively. For example, by sliding adjustment plate 76R forward or backward, with the screw 77R guiding the movement of the plate through opening 78R, the adjustment plate 76R pushes against or pulls away from a side of the L-shape plate 70R. As a result, the L-shaped plate 70R tilts and moves relative to the plate 72. Similarly, by sliding adjustment plate 76L forward or backward, with the screw 77L guiding the movement of the plate through opening 78L, the adjustment plate 76L pushes against or pulls away from a side of the L-shape plate 70L. As a result, the L-shaped plate 70L tilts and moves relative to the plate 72. This relative movement of the L-shaped plates (70R and 70L) allows the position of the transducers to be adjusted and more specifically the position of the end of studs 69R and 69L so that the end pieces 74R and 74L are positioned inside the holes 22R and 22L and press on the skin layer covering the manikin.

FIG. 5 shows plate 58 on which transducers 60R and 60L simulating the jugular venous pulse (JVP) are mounted, according to an embodiment of the present invention. The plate 58 is mounted to the wall 12 of the manikin 10 using fasteners 80, e.g. screws. The JVP transducers (right JVP transducer 60R and left JVP transducer 60L) are mounted to, respectively, L-shaped plates 82R and 82L. The L-shaped plates 82R and 82L are in turn mounted to the plate 58 using fasteners 83R and 83L for plate 82R and fasteners 84R and 84L for plate 82L. The L-shaped plate 82R has elongated openings 85R and 85L through which fasteners 83R and 83L penetrate to attach the L-shaped plate 82R to plate 58, and L-shaped plate 82L has elongated openings 86R and 86L through which fasteners 84R and 84L penetrate to attach the L-shaped plate 82L to plate 58. The elongated openings 85R, 85L, 86R and 86L allow the L-shaped plates 82R and 82L to move (translate and/or pivot) relative to the plate 58. In this way, the position of the JVP transducers 60R and 60L and more specifically the position of the actuating members 87R and 87L connected to the transducers 60R and 60L, can be adjusted in various directions so as to orient and position the actuating members 87R and 87L so as the movement generated by the transducers reach their intended target at jugular positions 20R and 20L (shown in FIG. 1).

Figure 6:
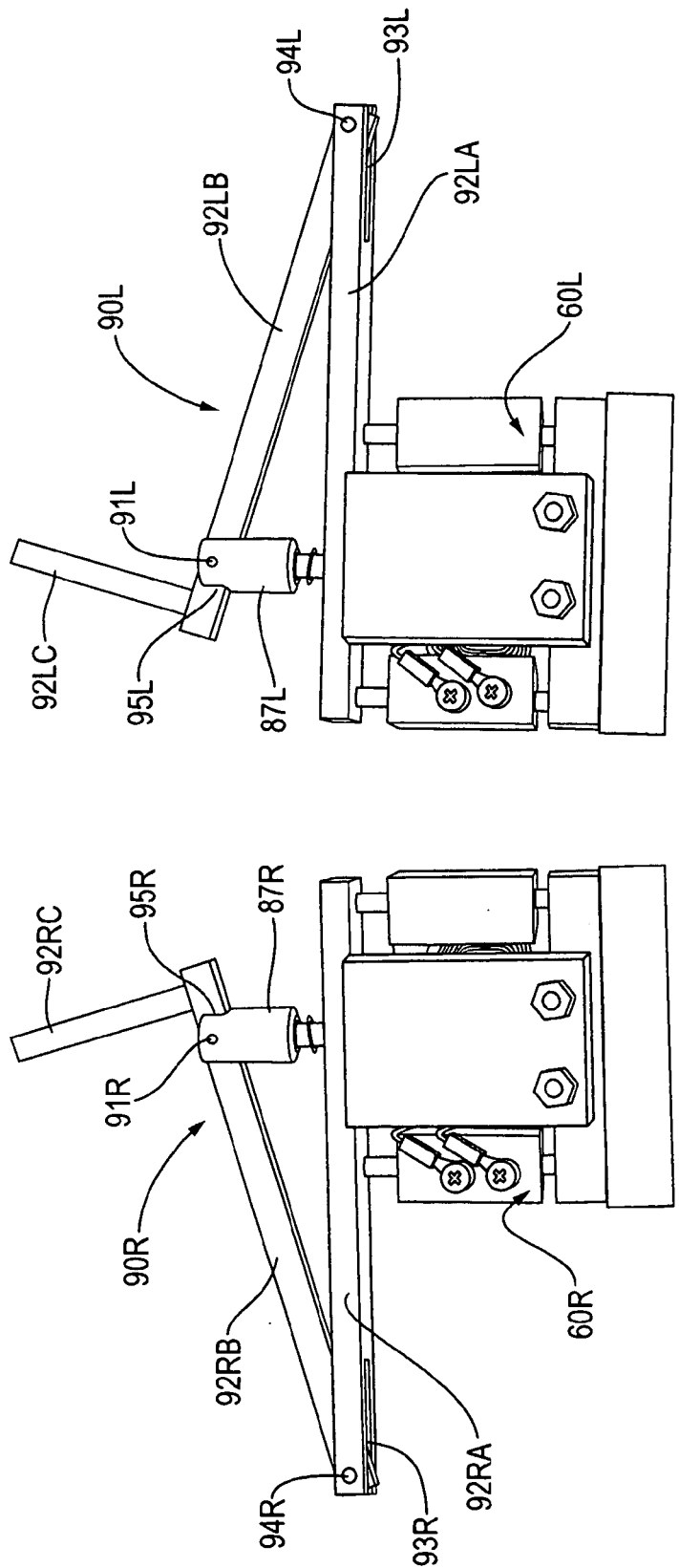
FIG. 6 is an elevational view of the jugular transducers with their respective actuating arm assemblies, according to an embodiment of the present invention.

FIG. 6 is an elevational view of the JVP transducers 60R and 60L with their respective actuating arm assemblies 90R and 90L, according to an embodiment of the invention. The actuating members 87R and 87L of JVP transducers 60R and 60L are connected to actuating arm assemblies 90R and 90L via connectors 91R and 91L. The actuating arm assemblies 90R and 90L each comprises three arms.

The actuating arm assembly 90R comprises a first arm 92RA fixedly attached to transducer 60R and having an opening (not shown) through which actuating member 87R extends. The actuating arm assembly 90R further comprises a second arm 92RB. Second arm 92RB is connected to a forked end 93R of first arm 92RA via a hinge 94R. The actuating member 87R is connected through a slot in end 95R of second arm 92RB so that when the actuating member 87R translates, the second arm 92RB rotates around the hinge 94R. The actuating arm assembly also comprises third arm 92RC which is connected substantially perpendicularly to end 95R of second arm 92RB. In this way, a translation of the actuating member 87R results in a rotation of second arm 92RB around hinge 94R which leads to an outward slightly arcuate movement of the third arm 92RC (to the left of FIG. 6).

Similarly, the actuating arm assembly 90L comprises a first arm 92LA fixedly attached to transducer 60L and having an opening (not shown) through which actuating member 87L extends. The actuating arm assembly 90L further comprises a second arm 92LB. Second arm 92LB is connected to a forked end 93L of first arm 92LA via a hinge 94L. The actuating member 87L is connected through a slot in end 95L of second arm 92LB so that when the actuating member 87L translates, the second arm 92LB rotates around the hinge 94L. The actuating arm assembly also comprises third arm 92LC which is connected substantially perpendicularly to end 95L of second arm 92LB. In this way, a translation of the actuating member 87L results in a rotation of second arm 92LB around hinge 94L which leads to an outward slightly arcuate movement of the third arm 92LC (to the right of FIG. 6). The third arms 92RC and 92LC are in contact with the outer flexible skin layer of manikin 10 at jugular pulse areas 20R and 20L (shown in FIG. 1). Hence, respective movements of the JVP actuators 60R and 60L is transferred to the third arms 92RC and 92LC of actuating arm assemblies 90R and 90L which allow to simulate pulses of the jugular veins at area 20R and 20L.

Figure 7:
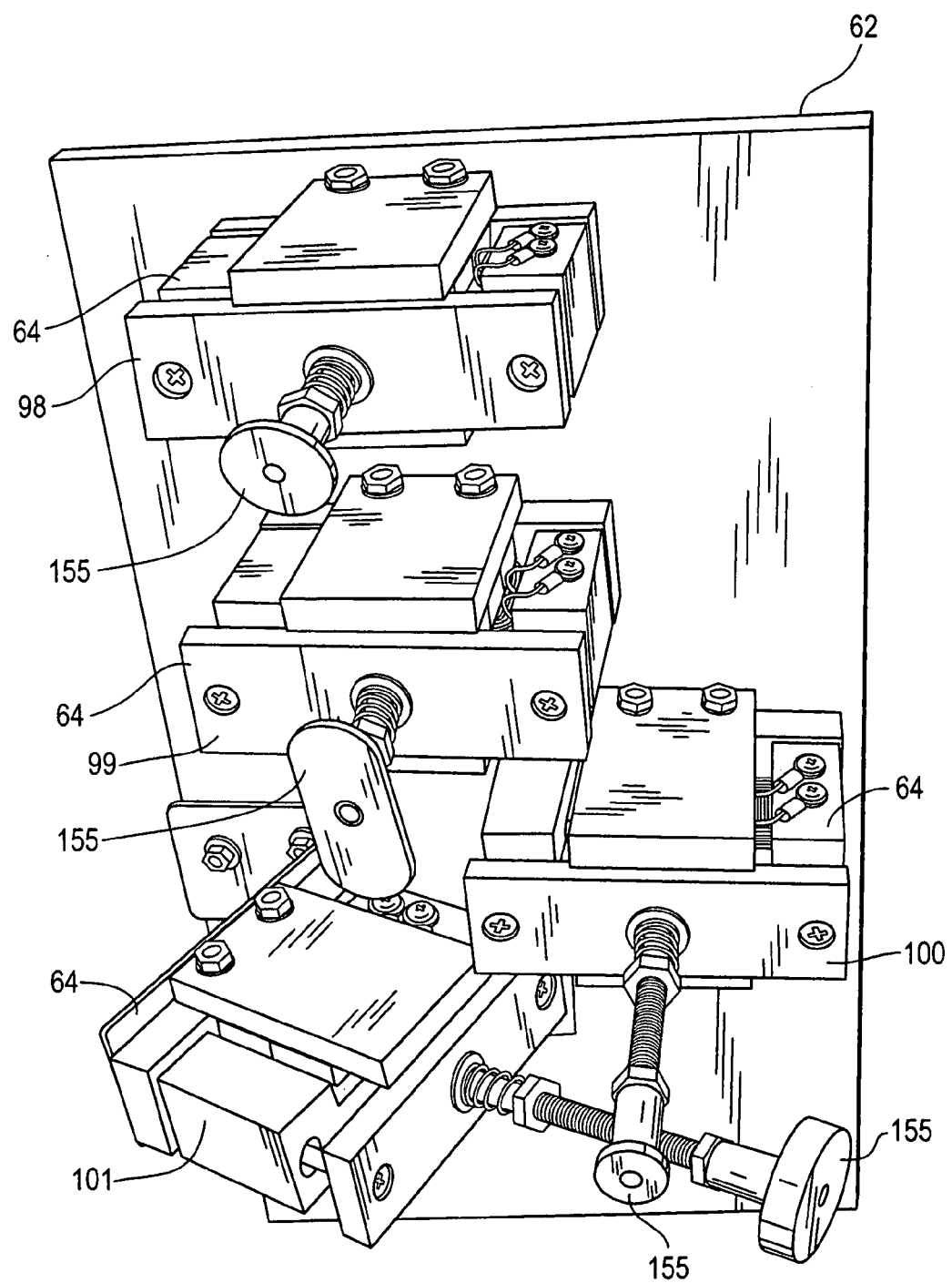
FIG. 7 is a perspective view of a chest plate supporting a plurality of transducers, according to an embodiment of the present invention.

FIG. 7 is a perspective view of chest plate or platform 62 which supports a plurality of transducers 64 including transducer 98, transducer 99, transducer 100 and transducer 102, according to an embodiment of the present invention. The chest plate 62 is fastened to wall 12 of manikin 10 by using appropriate fixtures. Transducer 98 is configured to simulate pulmonary artery (PUL) pulse in area 28. Transducer 99 is configured to simulate right ventricle (RV) pulse in area 30. Transducer 100 is configured to simulate left ventricle (LV) pulse in area 32. Transducer 101 is configured to simulate displaced left ventricle (DLV) pulse in area 34. Each of the transducers 64 is provided with an actuator at an end of which is placed an end-piece. The end-piece is adapted to come into contact with the flexible outer layer or skin of the manikin. Each end-piece is shaped to fit into respective holes in areas 28, 30, 32 and 34 of the wall 12 of manikin 10. In addition, each of the transducers 64 is adequately oriented so that its associated actuating member reaches its intended area. For example, DLV transducer 101 is oriented such that its associated actuating member reaches area 34 in the wall 12 of manikin 10. Each of the transducers 64 including transducers 98, 99, 100 and 101 is attached to plate 62 by using brackets and/or fasteners disposed in a certain fastening configuration.

Figure 8:
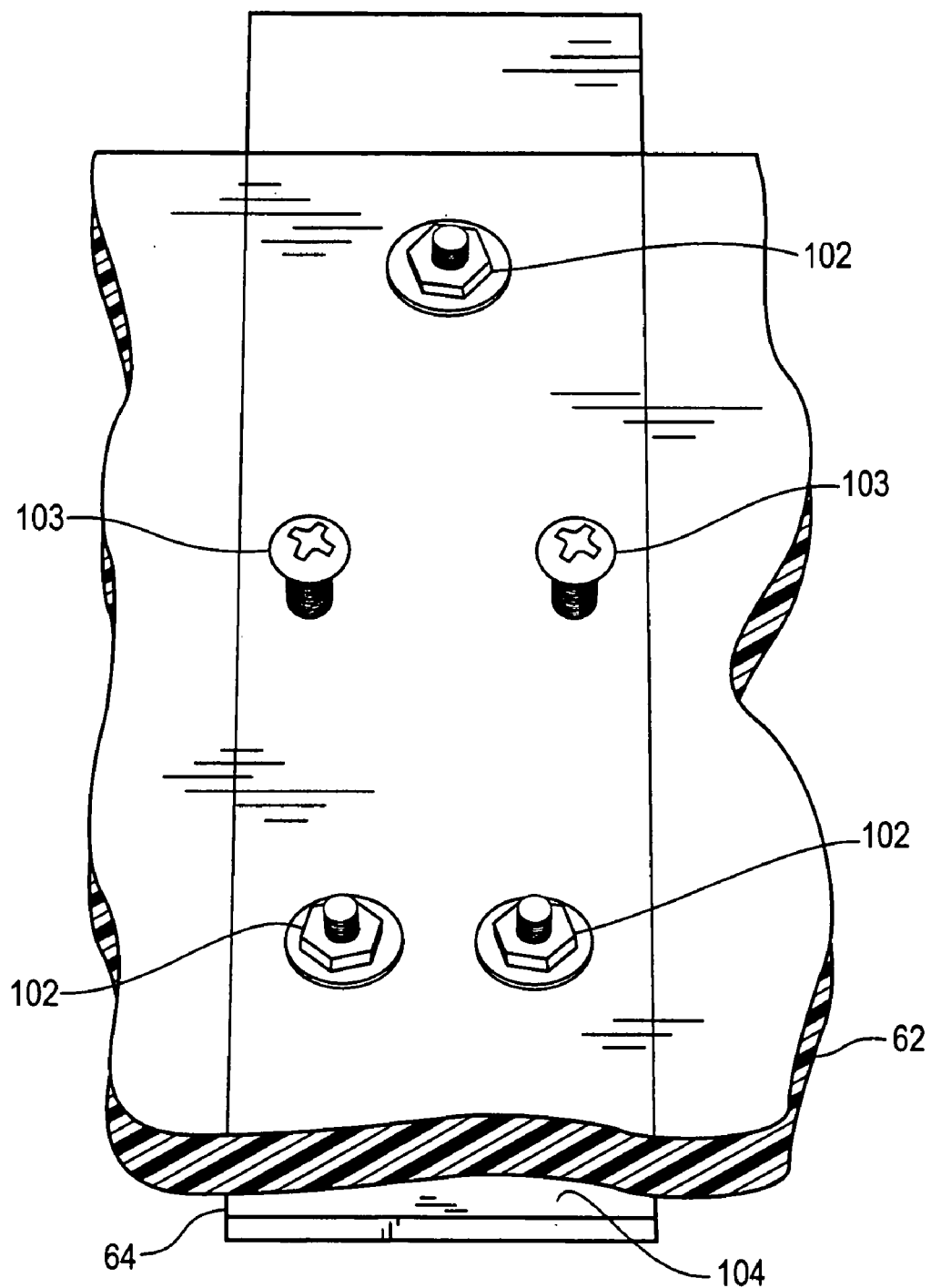
FIG. 8 is an example of a fastening configuration used for fastening a transducer, according to an embodiment of the present invention.

FIG. 8 shows an example of a fastening configuration, according to an embodiment of the invention. In this embodiment, transducer 64 is attached to plate 62 by a combination of fasteners 102 and 103. A number of fasteners 102 (e.g., a combination of nuts and bolts), in this case three, hold the transducer 64 against the plate 62 while a number of fasteners 103 (e.g., screws), in this case two, push against a surface 104 of the transducer 64. For example, the screws 103 are passed through threaded holes in plate 62 and push against the surface 104. By providing this combination of fasteners, the transducers 64 can be adjusted, for example tilted, relative to the plate 62. This can be done, for example, by unscrewing nuts of fasteners 102 and screwing fasteners 103 to a certain degree so that a desired orientation of the transducers 64 is achieved and finally tightening nuts of fasteners 102 to hold the transducer 64 in place. This fastening configuration may be suited in adjusting, for example, transducer 101 which is configured to simulate displaced left ventricle (DLV) pulse in area 34.

Figure 9:
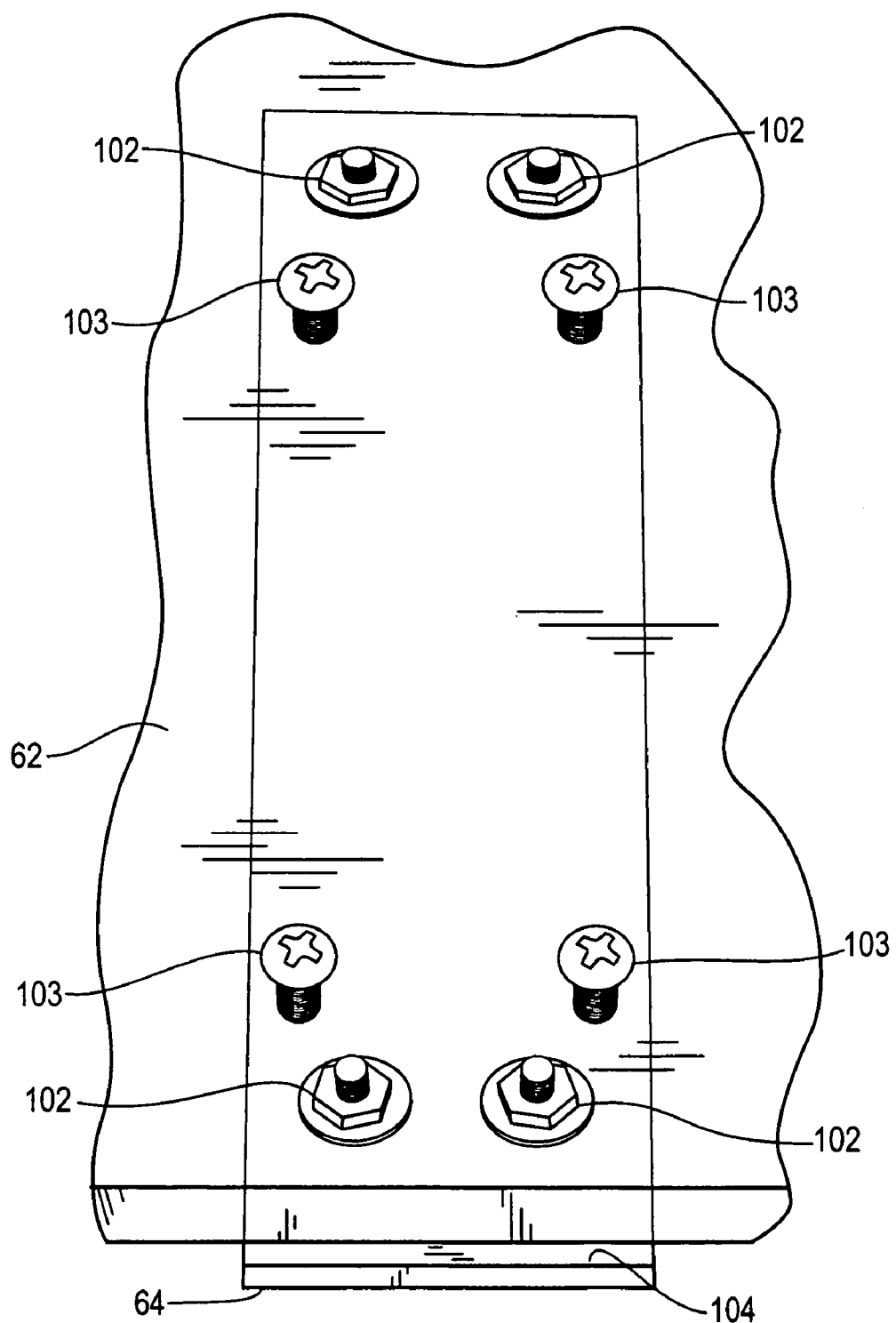
FIG. 9 is another example of a fastening configuration for fastening a transducer, according to another embodiment of the present invention.

FIG. 9 shows another example of a fastening configuration according to another embodiment of the invention. Similar to the configuration shown in FIG. 8, the transducer 64 is attached to plate 62 by a combination of fasteners 102 and 103. A number of fasteners 102 (e.g., a combination of nuts and bolts), in this case four, hold the transducer 64 against the plate 62 while a number of fasteners 103 (e.g., screws), in this case four, push against a surface 104 of the transducer 64. The transducers 64 can be adjusted, for example tilted, relative to the plate 62 by adjusting the different fasteners 102 and 103 in the manner described above. The fastening configuration shown in FIG. 9 may in certain circumstances provide an enhanced control for adjustment compared to the fastening configuration shown in FIG. 8. This fastening configuration (shown in FIG. 9) may be suited for adjusting, for example, transducer 98 which is configured to simulate pulmonary artery (PUL) pulse in area 28, transducer 99 which is configured to simulate right ventricle (RV) pulse in area 30 and/or transducer 100 which is configured to simulate left ventricle (LV) pulse in area 32.

Figure 10:
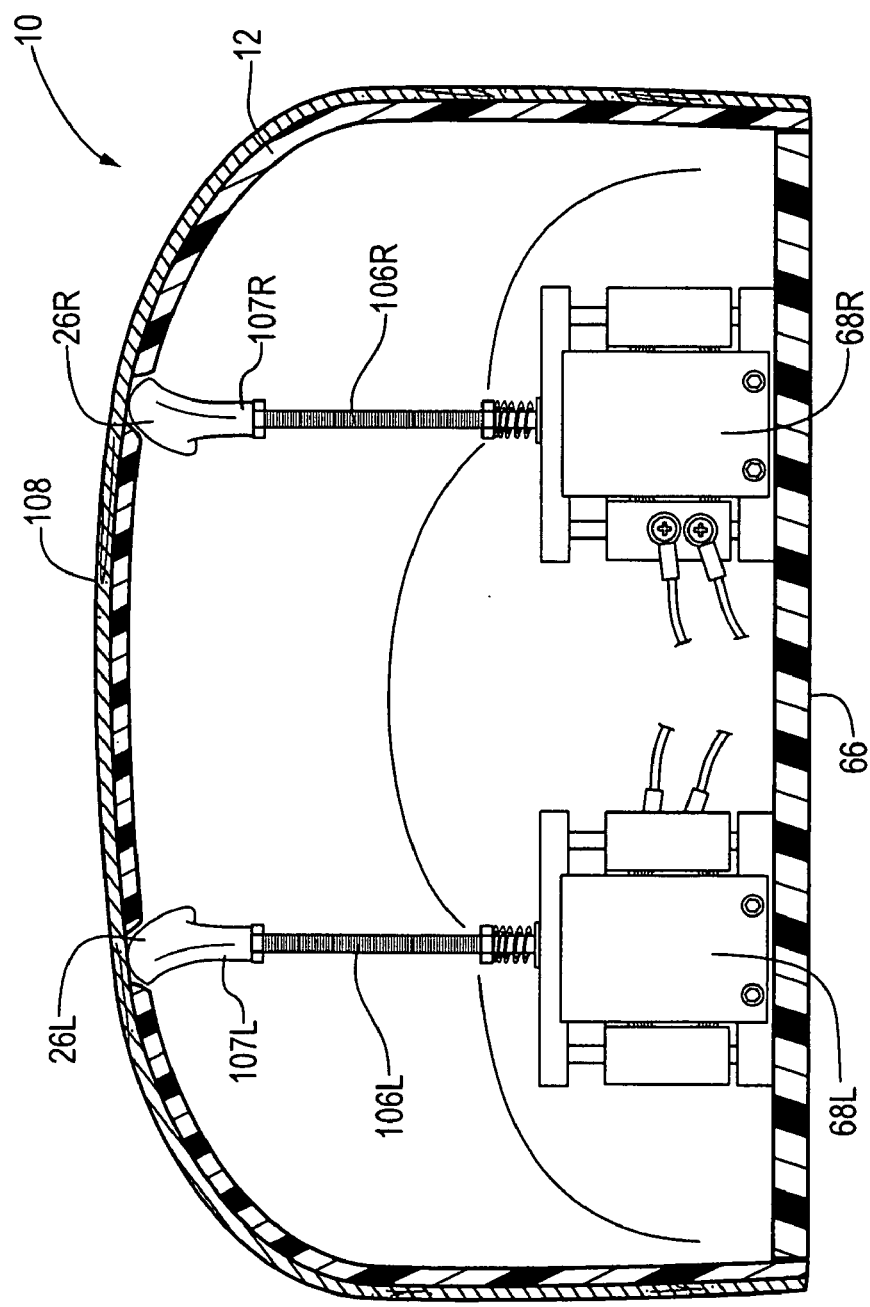
FIG. 10 is a cross-sectional view of the manikin shown in FIG. 1 around a lower abdomen area showing the femoral transducers, according to an embodiment of the present invention.

FIG. 10 is a cross-sectional view of the manikin 10 around the lower abdomen area showing the position of the femoral transducers 68R and 68L, according to an embodiment of the invention. The femoral transducers 68R and 68L which are configured to simulate femoral pulses in areas 26R and 26L of the wall 12 of manikin 10 are supported by platform or plate 66. The transducers 68R and 68L include actuating members 106R and 106L, respectively. Actuating members 106R and 106L include studs that are provided with end-pieces 107R and 107L. The actuating members 106R and 106L extend to reach the flexible outer layer 108 of the manikin 10 through holes in the wall 12 of the manikin 10 at areas 26R and 26L, respectively.

Figure 11:
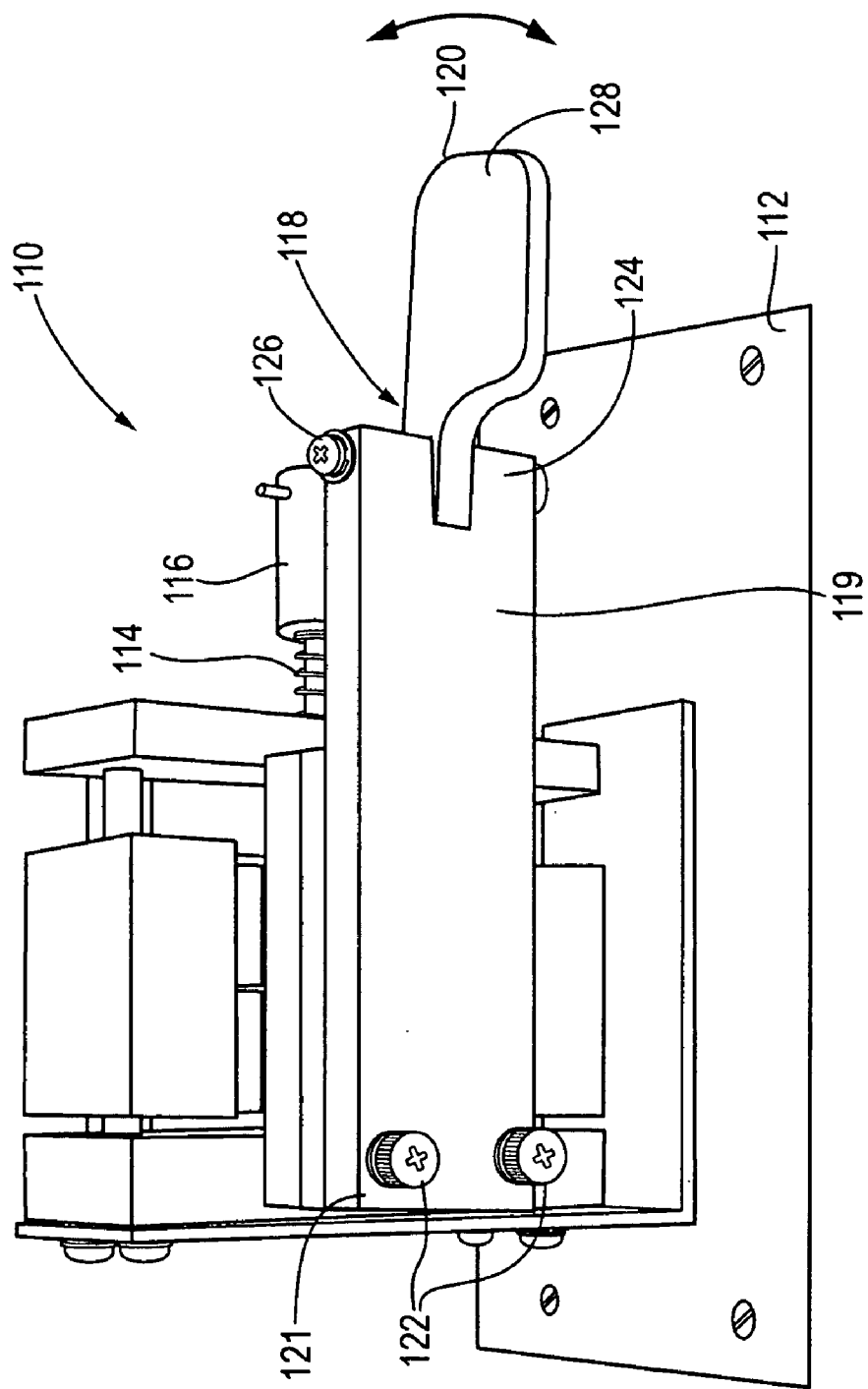
FIGS. 11 and 12 are perspective views of a brachial or radial transducer, according to an embodiment of the present invention.
Figure 12:
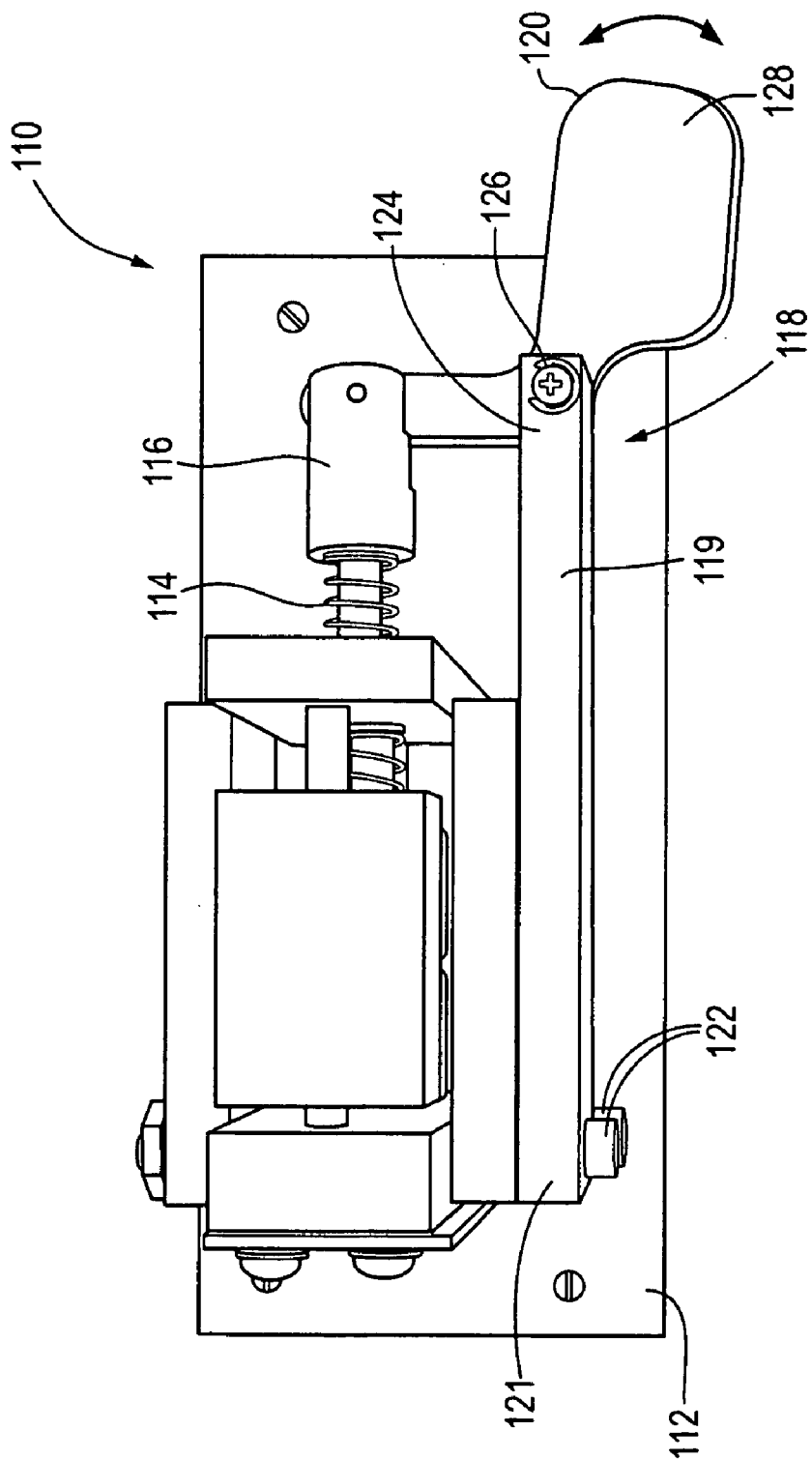

FIGS. 11 and 12 are perspective views of a transducer assembly used to generate brachial and radial pulses, according to an embodiment of the present invention. Transducer 110 is mounted on a plate 112. The plate 112 is mounted on a wall 12 in arm 18 of manikin 12. Transducer 110 comprises an actuating member 114 at an end of which is mounted a connector 116. An actuating arm assembly 118 is connected to the transducer 110. The actuating arm assembly 118 comprises a first arm 119 and a second arm 120. The first arm 119 is an elongated bar that is fixedly attached at one end 121 to the body of transducer 110 using fasteners 122. The first arm 119 has a forked end 124. The second arm 120 has an L-like shape as shown more clearly in FIG. 12. The second arm 120 is connected to the forked end 124 of first arm 119 via a hinge 126. The second arm 120 is driven by actuating member 114 via connector 116. The second arm 120 has a slotted end. A pin through connector 116 rides in the slot to drive second arm 120. When the actuating member 114 translates, the second arm 120 rotates around the hinge 126. As a result an end 128 of second arm 120 pivots around hinge 126 as indicated by the double arrow in FIGS. 11 and 12. The end 128 of second arm 120 is in contact with the outer flexible skin layer of manikin 10 at brachial pulse area 24 (shown in FIG. 1). Hence, the movement of transducer 110 is transferred to the second arm 120 of actuating arm assembly 118 to simulate the brachial and radial pulses.

Figure 13:
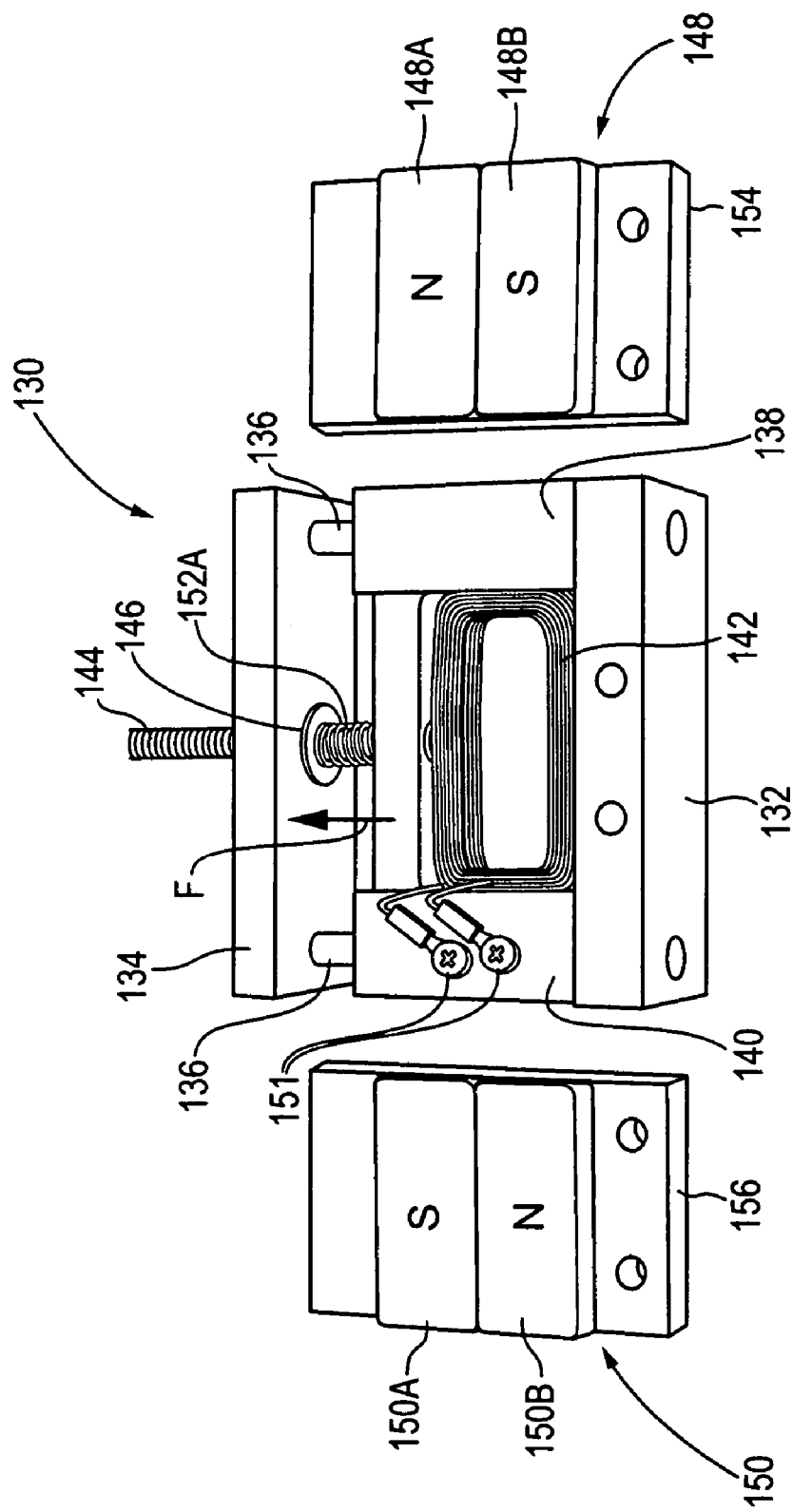
FIG. 13 is an exploded view of a transducer, according to an embodiment of the present invention.
Figure 14:
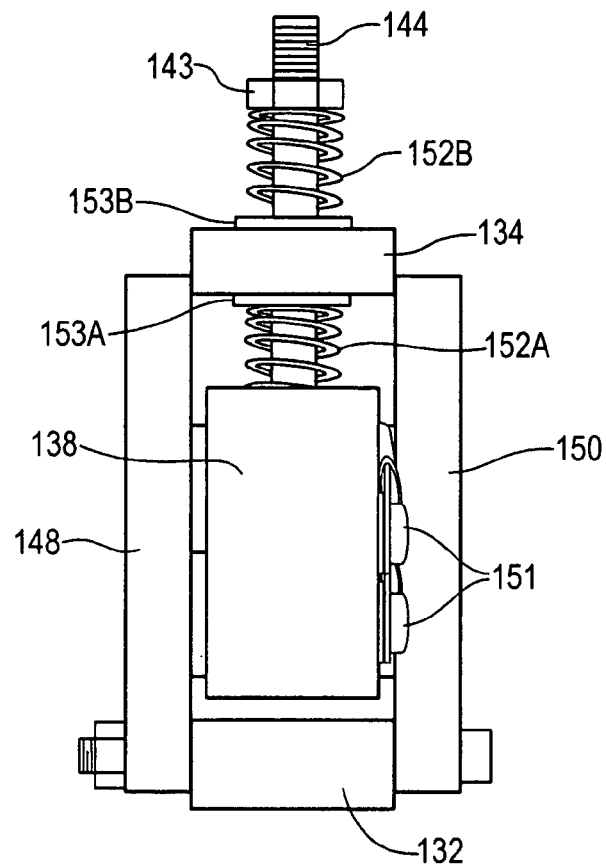
FIG. 14 is an elevational view of the transducer of FIG. 13.

FIG. 13 is an exploded view of a transducer used to generate pulses according to an embodiment of the present invention. FIG. 14 is an elevational view of the transducer of FIG. 13. Transducer 130 depicted in FIGS. 13 and 14 is an example of a transducer that can be used as carotid transducers 59R, 59L, jugular transducers 60R, 60L, femoral transducers 68R, 68L, pulmonary transducer 98, right ventricle transducer 99, left ventricle transducer 100, displaced left ventricle transducer 101 and brachial and radial transducers 110 discussed above.

The transducer 130 comprises a first plate 132 and a second plate 134 spaced apart from the first plate 132. The transducer 130 further comprises two elongated elements 136 configured to hold the first plate 132 and the second plate 134. An armature 138 is slidably mounted on the two elongated elements 136. The armature 138 is mounted between the first plate 132 and the second plate 134. The armature 138 comprises a frame 140 and a solenoid 142 wound adjacent a periphery of the frame 140. A rod 144 is attached to the frame 140 of the armature 138. The rod 144 extends through an opening 146 in the second plate 134.

Figure 15:
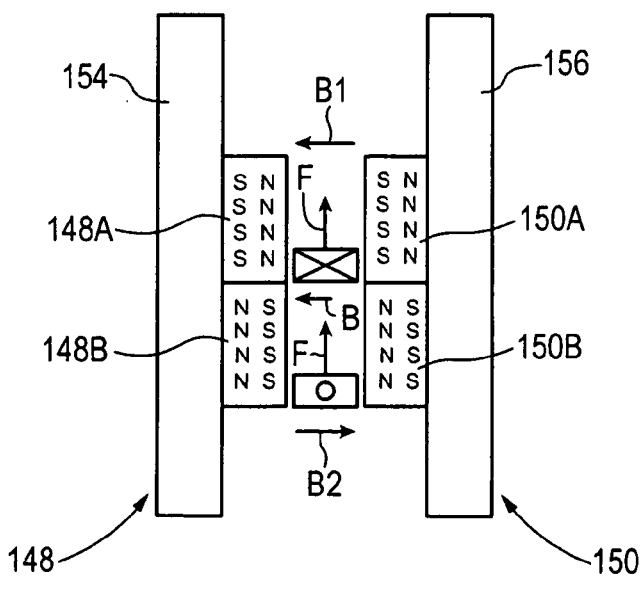
FIG. 15 is a lateral cross-section of the transducer of FIG. 13.

The transducer 130 further comprises a first magnet 148 and a second magnet 150. The first magnet 148 and the second magnet 150 are disposed between the first plate 132 and the second plate 134 facing each other and substantially perpendicular to the first plate 132 and the second plate 134. The first magnet 148 comprises two juxtaposed first and second sub-magnets 148A and 148B. The second magnet 150 comprises two juxtaposed first and second sub-magnets 150A and 150B. FIG. 15 is a lateral cross-section of the transducer 130 showing the relative position of the different magnets, according to an embodiment of the present invention. The two sub-magnets 148A and 148B have magnetic fields oriented substantially in opposite directions. For example as shown in FIGS. 13 and 15, sub-magnet 148A is oriented north (N) facing armature 138 and sub-magnet 148B is oriented south (S) facing armature 138. Similarly, the two sub-magnets 150A and 150B have magnetic fields oriented substantially in opposite directions. For example, sub-magnet 150A is oriented south (S) facing armature 138 and sub-magnet 150B is oriented south (N) facing armature 138.

In addition, the first magnet 148 and the second magnet 150 are positioned such that the first sub-magnet 148A of the first magnet 148 is oriented (S to N) substantially in a same direction as the first sub-magnet 150A of the second magnet 150. Furthermore, the first magnet 148 and the second magnet 150 are positioned such that the second sub-magnet 148B of the first magnet 148 is oriented (S to N) substantially in a same direction as the second sub-magnet 150B of the second magnet 150. Because the sub-magnets 148A and 150A face each other, the resultant magnetic field B 1 created by the two sub-magnets 148A and 150A is oriented S to N from the sub-magnet 150A to the sub-magnet 148A. Similarly, because the sub-magnets 148B and 150B face each other, the resultant magnetic field B2 created by the two sub-magnets 148B and 150A is oriented S to N from the sub-magnet 148B to the sub-magnet 50B. Hence, the magnetic field B1, between sub-magnets 148A and 150A, and the magnetic field B2, between sub-magnets 148B and 150B, are substantially parallel but oriented in opposite directions.

When the solenoid 142 is energized by applying a current to electrodes 151 (shown in FIGS. 13 and 14), the current produces an electromagnetic field B in the solenoid 142. The direction of the current flow in the solenoid is shown in FIG. 15 with an "X" to show that the current flows perpendicular to the plane of FIG. 15 in a direction facing away from the viewer and with a "O" to show that the current flows perpendicular to a plane of the FIG. 15 in a direction facing the viewer. As a result, the electromagnetic field B produced by the current has a same direction as the magnetic field B1 and has an opposite direction to magnetic field B2.

The electromagnetic field B interacts with the respective magnetic fields B1 and B2 to generate a force F (indicated by an arrow in FIGS. 13 and 15) that moves the armature 138 along the elongated elements 136. In other words, the magnetic field B being opposite to magnetic field B2 and in the same direction as magnetic field B1, would force the solenoid 142 (hence the armature 138) to move such that the magnetic field B "leaves" the space between sub-magnets 148B and 150B covered by magnetic field B2 (which is opposite to magnetic field B) to substantially align with magnetic field B1 (which is in the same direction as magnetic field B). Explained differently, electromagnetic field B interacts with the magnetic field B 1 to generate a first force component and interacts with the magnetic field B2 to generate a second force component. The first force component and the second force component are compounded to form the force F that moves the armature.

The generated force F is substantially perpendicular to the electromagnetic field B generated by the application of current in the solenoid 142. By providing two magnets 148 and 150, each having two sub-magnets, respectively, 148A and 148B and 150A and 150B positioned in the manner discussed above, the generated force F has a magnitude twice a magnitude of a force generated by a conventional transducer.

In an embodiment of the invention, the first magnet 148 and the second magnet 150 are permanent magnets. However, it must be appreciated that electromagnets can be used instead or in combination with permanent magnets. In an embodiment of the invention, the frame 140 of the armature 138 is formed from a plastic. However, other materials are also within the scope of the present invention. In an embodiment of the invention, the first and second plates 132 and 134 are made of a metal such as aluminum. However, other suitable materials may be used instead or in combination with aluminum. The frame 140 of armature 138 has a U-like shape and the rod 144 is mounted on a base of the U-like shape. However, other shapes, such as frame-like shapes, are also contemplated.

In an embodiment of the invention, magnet backing plates 154 and 156 are provided to hold, respectively, the first magnet 148 and the second magnet 150 between the first and second plates 132 and 134. In an embodiment of the invention, the magnet backing plates 154 and 156 are made of nickel plated steel. Nickel plating is used as a rust inhibitor. However, it must be appreciated that other materials (e.g., high permeability materials) are also contemplated herein. The backing plate 154 and magnets 148A and 148B effectively create a horseshoe magnet with twice the field of the magnets taken individually. Similarly, the backing plate 156 and magnets 150A and 150B create a second horseshoe magnet oppositely polarized. In this way, the magnetic field to which the solenoid 142 is exposed is increased over that of individually paired magnets. In addition by providing the backing plates 154 and 156, the backing plates help to channel the lines of magnetic field and the magnetic field is contained within the area where the solenoid is disposed.

The transducer 130 further includes a resilient member 152A disposed around the rod 144 between the second plate 134 and the frame 140 of the armature 138. The transducer 130 also includes a resilient member 152B disposed around the rod 144 between the second plate 134 and a stop 143 coupled to the rod 144. In this embodiment, the resilient members 152A and 152B are springs. However, it must be appreciated that other resilient members, such as flexible rubbers or plastics or the like, may be used instead or in combination with a spring. A washer 153A is provided so that the resilient member 152A does not escape through the hole 146 in plate 134 to bias the frame 140 of the armature 138 toward the first plate 132. A washer 153B is also provided so that the resilient member 152B does not escape through the hole 146 in plate 134 to bias the frame 140 of the armature 138 toward the second plate 134. When a current is applied to the solenoid 142, the force F generated by the current overcomes the biasing force of the resilient member 152A which acts in opposite direction to force F. The force generated by the solenoid 142 is equal to the number of turns in the solenoid times the current flowing through the solenoid 142 ($F=n \cdot i$). Since the number of turns (n) is fixed, the force F is directly proportional to the current (i). On the other hand, the force generated by a spring is equal to the constant of the spring times the displacement ($F'=k \cdot \Delta$, where k is the constant of the spring and $\Delta$ is the displacement). Therefore, the force of the springs varies directly proportionally with the displacement $\Delta$. Because spring 152A provides a force F' opposite the force F generated by the solenoid, a bipolar current may not be needed to return the solenoid to its neutral position. If the current in the solenoid 142 is interrupted or is diminished to a certain level, the force generated by the spring 152A overcomes the force generated (if any) by the solenoid 142. The spring 152B is provided to counteract the force generated by spring 152A so as to establish a neutral position in which armature 138 is slightly displaced from frame 132. Hence, the combination of the two resilient members 152A and 152B serve to maintain the frame 140 of the armature 138 at a desired neutral position when the solenoid 142 is not energized. This allows, among others, a consistent initial position of the armature with each application of current. As a result, a better control the movement of the armature 138 during the application of a current to the solenoid 142 can be achieved.

When a current is applied to the solenoid 142, the armature 138 and associated rod 144 move in a direction of force F to push against the flexible skin area of the wall of the manikin. When the current in the solenoid 142 is diminished, armature 138 and associated rod 144 move in a direction away from the flexible skin area of the wall of the manikin. When the current in the solenoid 142 is interrupted, the force F generated by the interaction of electromagnetic field in the solenoid 142 with the magnetic fields of magnets 148 and 150 ceases. As a result, the biasing force of the resilient member 152A takes over and pushes the armature 138 back towards the neutral position, guided by the elongated elements 136. Because the rod 144 is attached to the armature 138, the rod follows the translating movement of the armature 138. As a result, the next time a current is applied to the solenoid 142, the armature 138 and associated rod 144 would move from the neutral position.

This back and forth movement of the armature 138 and coupled rod 144 allows to simulate, for example, cardiovascular pulses in specific areas in the manikin 10 (for example, areas shown in FIG. 1). Hence, by controlling the intensity and frequency of the current in the solenoid 142, the magnitude, the direction and repetition of the resultant force F can be controlled and as a result the shape and/or frequency of, for example, the cardiovascular pulses can be controlled.

An end-piece or bumper member 155 and 107L and 107R (shown, for example, in FIGS. 7 and 10) are provided at the end of the rod 144. The shape of any of the bumper members 155, 107L and 107R can be selected depending on desired parameters. For example, the shape of the bumper member can be selected depending on its location and/or its function so as to approximate the size and shape of the pulse it mimics. The bumper member is positioned in a hole portion (for example, hole 22R) in the wall 12 of the manikin 10 so as to be in contact with the flexible skin area. When the transducer is energized, the rod 144 moves back and forth against the flexible skin area to simulate cardio-vascular pulses (for example, carotid pulses). The bumper member 155 provides a cushion so that when the rod pushes against the skin portion in a hole portion corresponding to a specific cardiovascular area, the rod does not perforate or damage the skin area.

Figure 16:
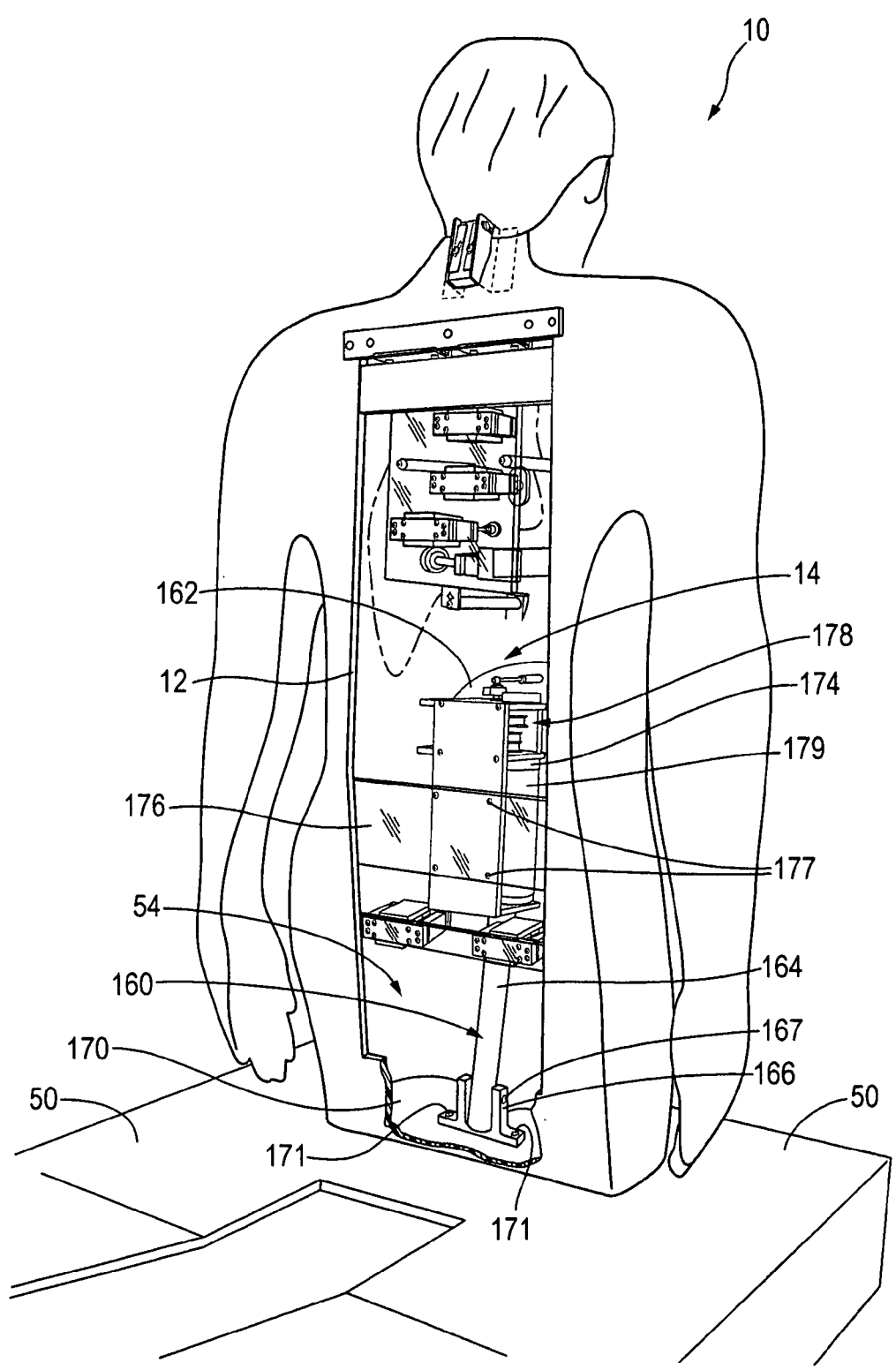
FIG. 16 is a rear elevational view of the manikin shown in FIG. 1, according to an embodiment of the present invention.

FIG. 16 is another rear elevational view of the manikin 10 with a cutaway in the lower section of opening 54 to show an arm assembly 160 used to hold an abdominal plate 162 (shown also in FIG. 3). The arm assembly 160 comprises a lever 164 and a hinge 166. The lever 164 is rotatably connected at one end to the hinge 166 via connector 167. The hinge 166 is fastened to base portion 170 of manikin 10 using fasteners 171. The base portion 170 closes the cavity 14 of manikin 10 around the thigh part of the manikin 10. The lever 164 is shown in FIG. 16 having a cylindrical shape. However, it must be appreciated that lever 164 can have any other suitable shape including, for example a parallelepiped shape and a hexagonal shape. The lever 164 is fastened at its other end to abdominal plate 162. In an embodiment of the invention, the abdominal plate 162 is a cut portion of wall 12 of manikin 10. The abdominal plate 162 is cut from the wall 12 so as to permit a movement in the area 46 of the skin of the manikin (shown in FIG. 1) to simulate a breathing movement in the abdomen. Because the plate 162 is not attached to the wall 12, the plate 162 is held in place by using arm assembly 160.

A breathing mechanism 174 is provided in the cavity 14 of manikin 12 to move the plate 162 in a direction generally perpendicular to the plate 162. The breathing mechanism 174 is attached to a support plate 176 with fasteners 177. The support plate 176 is fastened to wall 12 of manikin 10. The breathing mechanism 174 comprises a pulley assembly 178 and a motor 179.

Figure 17:
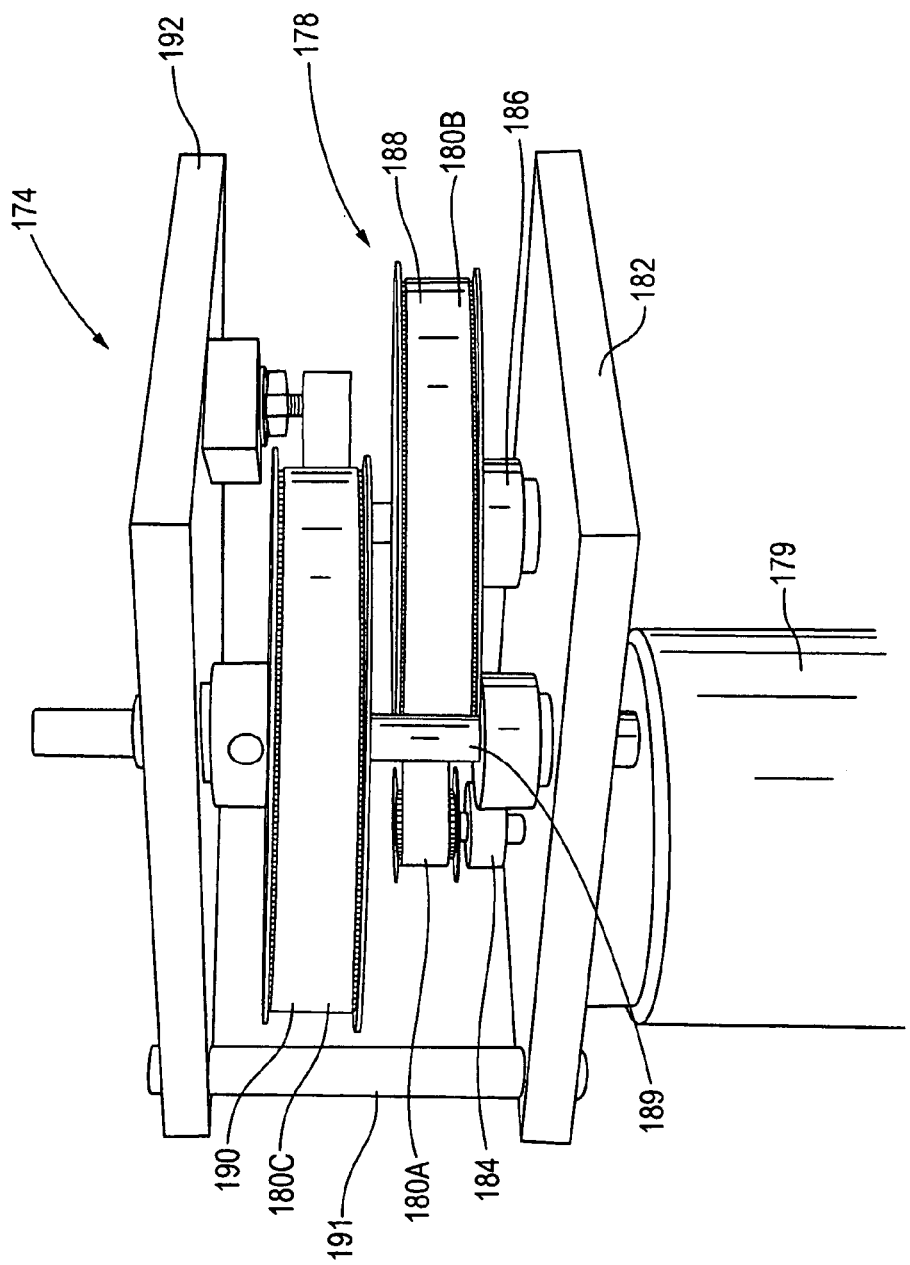
FIG. 17 is a perspective view of a breathing mechanism, according to an embodiment of the present invention.
Figure 18:
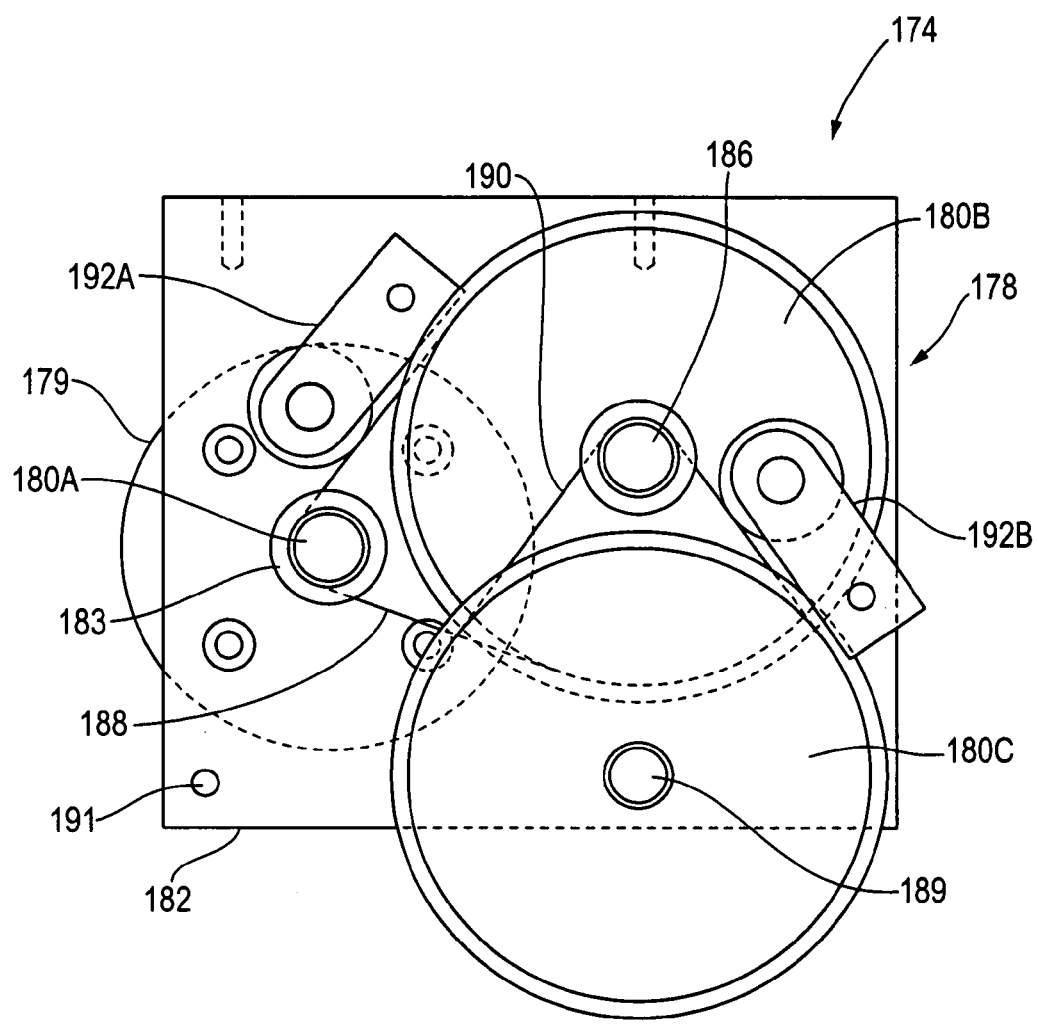
FIG. 18 is a top view of a pulley assembly of the breathing mechanism depicted in FIG. 17.
Figure 19:
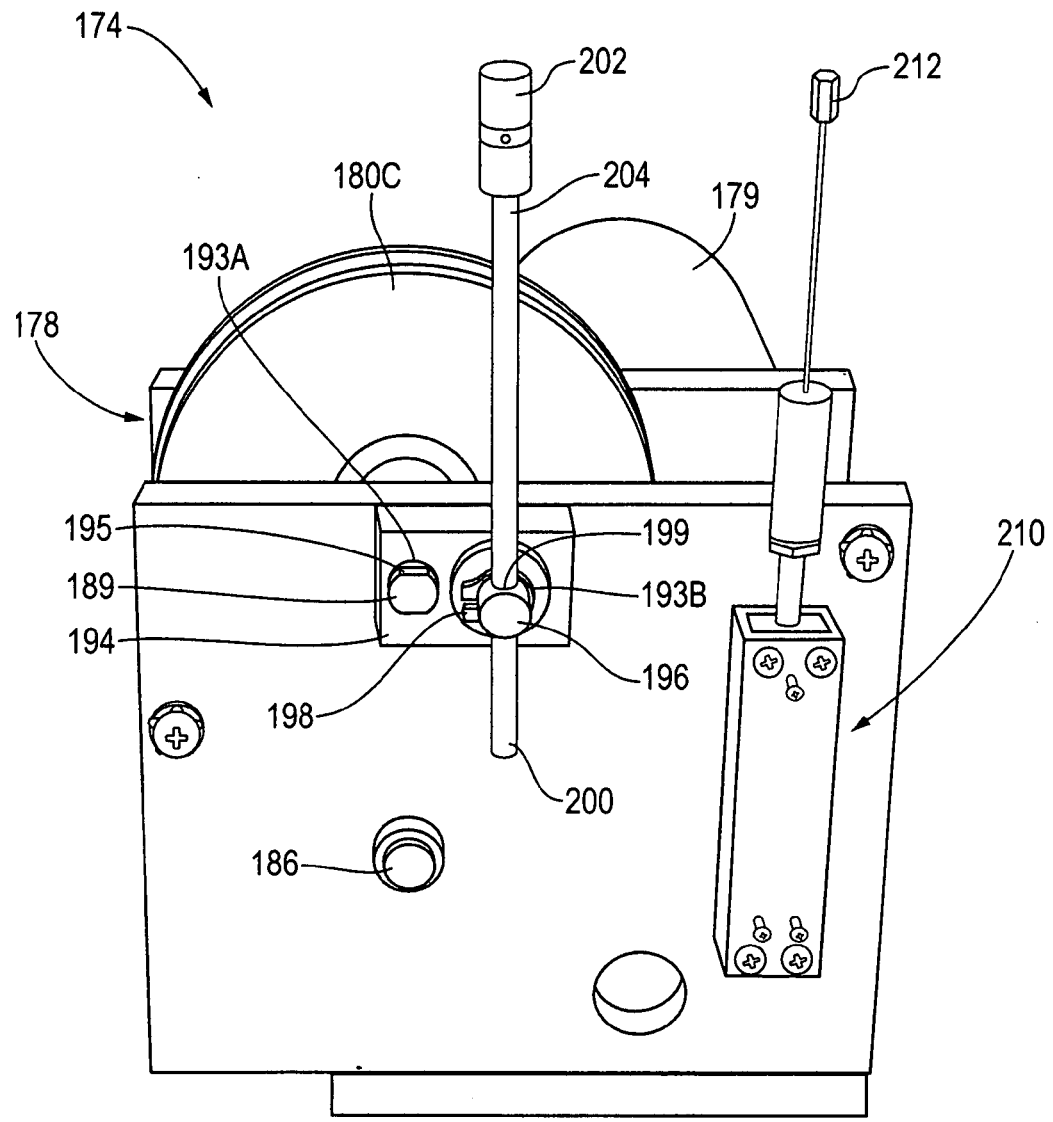
FIG. 19 is a top perspective view of the breathing mechanism shown in FIG. 17.

FIGS. 17, 18 and 19 are various views of the breathing mechanism 174, according to an embodiment of the invention. The pulley assembly 178 comprises a plurality of pulleys 180A, 180B and 180C. FIG. 17 is a perspective view of the breathing mechanism 174 showing the position of various pulleys 180A, 180B and 180C in the pulley assembly 178 and the motor 179. FIG. 18 is a top view of the pulley assembly 178 showing the relative positioning of the various pulleys 180A, 180B and 180C. The motor 179 is mounted onto a first plate 182. The first plate 182 has a hole 183 (shown in FIG. 18) through which a drive shaft 184 of the motor 179 penetrates. The pulley 180A is mounted to the drive shaft 184 of the motor 179. The pulley 180B is fixedly mounted onto a rod 186. The rod 186 is rotatably mounted to plate 182 and is spaced apart from drive shaft 184. A serpentine belt 188 links pulley 180A to pulley 180B so that a rotation of the drive shaft 184 of motor 179 is transferred to the pulley 180B. The pulley 180C is fixedly mounted onto a rod 189. The rod 189 is rotatably mounted to plate 182 and is spaced apart from drive shaft 184 and the rod 186. A serpentine belt 190 links rod 186 to pulley 180C. Hence, a rotation of the pulley 180B, which translates into a rotation of the rod 186, transfers via the serpentine belt 190 to pulley 180C. The rotation of pulley 180C translates into a rotation of rod 189. Tightening belt devices or idler rollers 192A and 192B are provided in the pulley assembly 178 to tense the serpentine belts 188 and 190 or to hold the serpentine belts 188 and 190 against the various pulleys. The pulley assembly 178 is enclosed between the first plate 182 and a second plate 192. The second plate 192 is mounted spaced apart from the first plate using spacer rod 191. The rod 189 penetrates through a hole (not shown) in the second plate 192 to link with a crank 194 (Shown in FIG. 19).

FIG. 19 is a top perspective view of the breathing mechanism 174 showing an end 195 of the rod 189 linked with the crank 194. The end 195 of rod 189 has a double-D configuration which intimately fits into a first hole 193A in crank 194. With this configuration, a rotation of the rod 189 is transmitted to the crank 194. The crank 194 has a second hole 193B through which a crank shaft 196 is mounted. The crank shaft 196 is allowed to freely rotate in the second hole 193B. C-clips 198 are used around grooves at each end of the crank shaft to rotatably mount the crank shaft 196 onto crank 194. An arm 200 is mounted to crank shaft 196 through a hole 199 provided at an end of the crank shaft 196.

A back and forth rotation of the motor 179 would transfer to a rotation of the rod 189. A back and forth rotation of the rod 189 would result in a back and forth rotation of the crank 194. Because the crank shaft 196 is allowed to freely rotate in the second hole 193B of the crank 194, the back and forth rotation of the crank 194 is transmitted as a back and forth translation of the arm 200. A universal joint 202 is mounted at an end 204 of arm 200. The universal joint 202 is attached to the abdominal plate 162 (shown in FIGS. 3 and 16). Hence, a back and forth translation of the arm 200 would result in the joint 202 moving the abdominal plate 162. The universal joint 202 is a joint with a certain flexibility. The universal joint 162 can accommodate a large angular variation between its input at a connecting end with the extremity 204 of rod 200 and its output end attach to the abdominal plate 162. The universal joint 202 serves to transmit the motion of arm 200 to the abdominal plate 162 even in instances where the arm 200 is not perpendicular to the abdominal plate 162.

The breathing mechanism 174 further comprises a position sensor 210 such as a linear potentiometer. The position sensor 210 is configured to sense the movement and thus the position of abdominal plate 162 using adjustable sensing tip 212. The position sensor 210 provides a feedback electrical signal via a feedback loop to an input of motor 179 to control the rotation of the driving shaft 184 of motor 179 and hence control the transfer of movement of arm 200 to abdominal plate 162.

Figure 20:
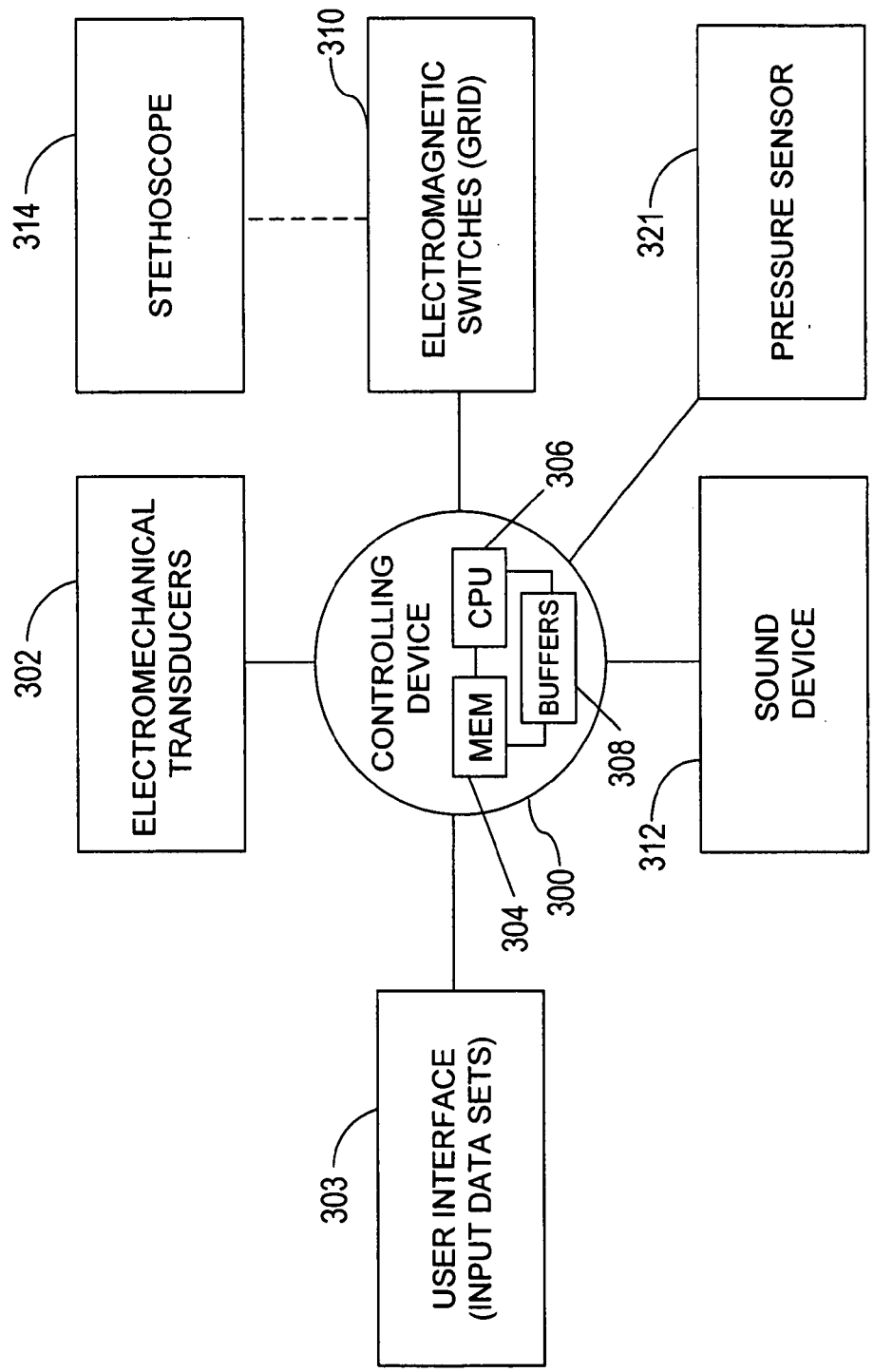
FIG. 20 is an electronic diagram of a controlling device and other devices and systems used in the cardiopulmonary patient simulator, according to an embodiment of the present invention.

The cardiopulmonary simulator (CPS) further comprises a controlling device. FIG. 20 is an electronic diagram of the controlling device and other devices and systems used in the CPS, according to an embodiment of the present invention. In an embodiment of the invention, the controlling device 300 is housed in a housing of table top 50 (shown in FIGS. 2 and 16). The controlling device 300 electrically communicates with the plurality of electromechanical transducers 302, for example, right and left carotid transducers 59R, 59L, right and left jugular transducers 60R, 60L, right and left femoral transducers 68R and 68L, pulmonary transducer 98, right ventricle transducer 99, left ventricle transducer 100, displaced left ventricle transducer 101 and brachial and radial transducers 110 described above. The controlling device 300 is configured to control the plurality of electromechanical transducers 302 by applying a plurality of sets of electrical signals. Each set of electrical signals corresponding, respectively, to one of a plurality of health conditions. The plurality of sets of electrical signals are generated by inputting a corresponding plurality of data sets via user interface 303, for example user interface 52 (shown FIG. 2), into a memory device 304 of the controlling device 300 and running a computer program using computer processing unit (CPU) 306 in the controlling device 300. The computer program comprises a set of instructions to generate the plurality of sets of electrical signals. In an embodiment of the invention, the user interface 303 may include a keypad, a mouse, a joystick, etc. The user interface 303 may further include a display device, such as an electro-fluorescent display or a liquid crystal display to display the status of the CPS.

Figure 21:
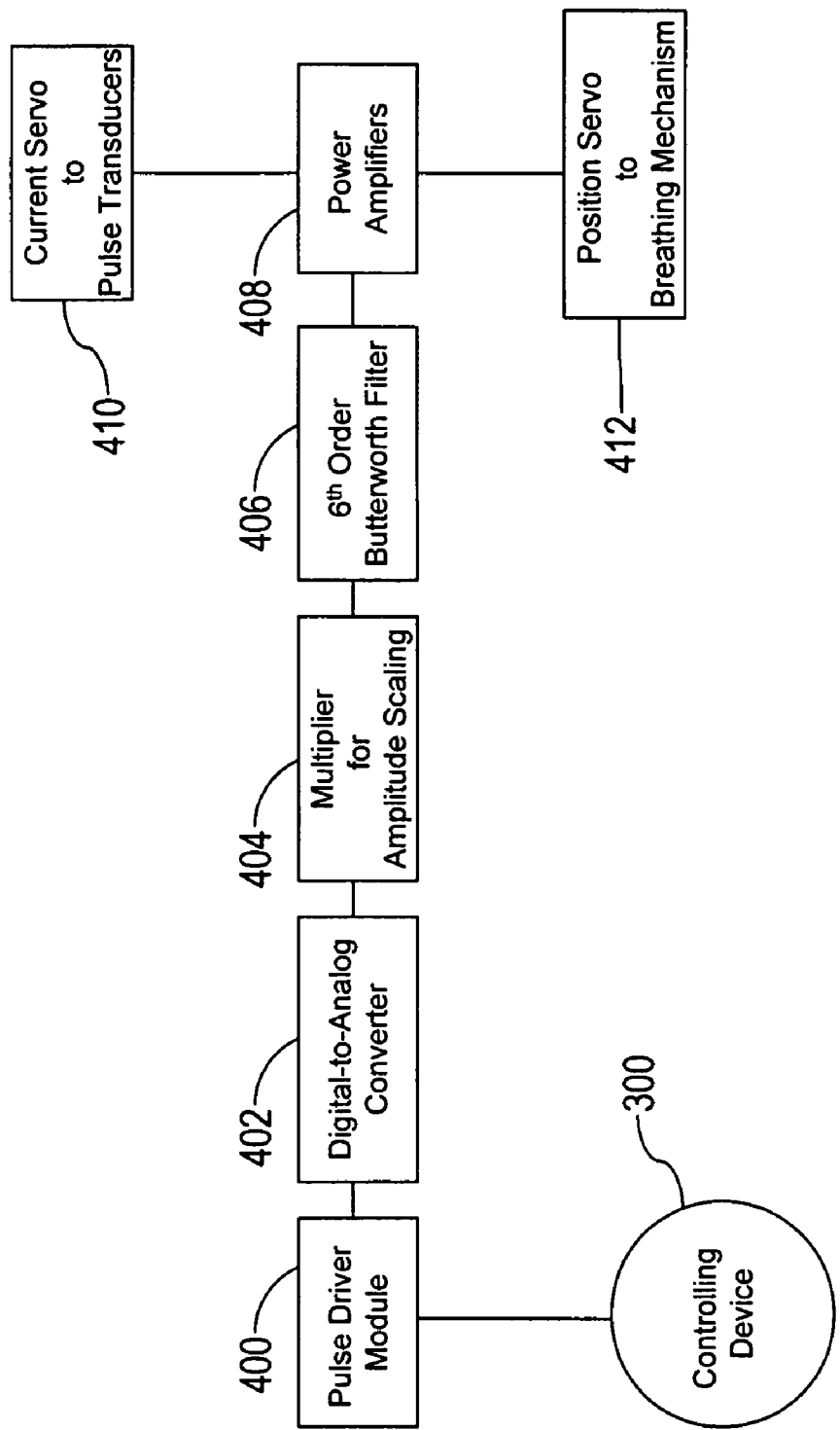
FIG. 21 is an electronic diagram of a chain of a components used for controlling transducers, according to an embodiment of the present invention.

FIG. 21 is an electronic diagram of the chain of components used for controlling the electromechanical transducers 302, according to an embodiment of the present invention. The controlling device 300 sends an electric signal to a pulse driver module 400. The pulse driver module 400 is connected to a digital-to-analog converter 402 for converting the digital signal provided by the controlling device 300 into an analog signal. The analog signal is multiplied for amplitude scaling by multiplier 404. The amplitude scaled analog signal is sent to $6^{th}$ order Butterworth filter 406 for frequency filtering. A Butterworth filter is a lowpass filter designed to have a flat frequency response in the passband range. The filtered analog signal is then sent to power amplifiers 408 for amplifying the power of the analog signal. The amplified signal is transferred to a current servo 410 for driving pulse transducers such as, for example, carotid transducers 59R, 59L and jugular transducers 60R, 60L and/or sent to position servo 412 for driving the breathing mechanism 174.

As stated above, the plurality of electromechanical transducers 302 are disposed in the cavity 14 of manikin 10. The plurality of electromechanical transducers 302 comprise mechanical components (for example actuators or studs 69R, 69L, 106R and 106L), coupled to selected parts of the wall 12 of the manikin 10 (for example, carotid areas 22R and 22L and jugular areas 20R and 20L). As described above, the plurality of electromechanical transducers 302 are configured to produce simulated movements of the selected parts of the wall 12 of the manikin 10. The plurality of transducers 302 are configured to move the selected parts of the wall 12 in a predetermined manner. In an embodiment of the invention, the controlling device 300 controls the plurality of transducers 302 such that the relationship between corresponding bilateral movements of the selected parts of the wall 12 of the manikin 10 is different from one health condition to another health condition in the plurality of health conditions. In an embodiment of the invention, an intensity of an electrical signal in the set of electrical signal is controllable relative to other intensities of other electrical signals in the set of electrical signals.

The set of data in the plurality of sets of data can be selected using the user interface 303 for processing by the computer program using CPU 306 at any given moment during the progress of a simulation. The set of data is sampled from a desired curve-function corresponding, for example, to a shape of heart beat or a certain cardiovascular pulse.

In an embodiment of the invention, the controlling device 300 comprises a plurality of memory devices 304, each of which carries a different set of data corresponding to a health condition. The set of data are input into a computer program, via user interface 303, when executed by the CPU 306 of the controlling device 300 generates the plurality of electrical signals to control the plurality of electromechanical transducers 302.

In another embodiment of the invention, the controlling device 300 comprises a memory device 304 and a plurality of buffers 308. The memory device 304 is configured to carry a plurality of sets of data corresponding to a plurality of health conditions. Each of the plurality of buffers 308 carries a different set of data corresponding to one of the health conditions. A set of data in one of the plurality of buffers 308 are used by the computer program when executed by the CPU 306 of controlling device 300 to generate the plurality of electrical signals to control the plurality of electromechanical transducers 302 to simulate one of the health conditions. In an embodiment of the invention, the computer program is selectable to run with input data from any one of the plurality of buffers 308 at any desired time. Hence, the computer program can be switched at any time of the simulation to run with a specific input data from any one of the plurality of buffers.

The cardiopulmonary simulator further comprises a plurality of electromagnetic switches 310. The electromagnetic switches 310 are disposed inside the cavity 14 of manikin 10 adjacent a portion of the wall 12 of the manikin 10. The plurality of electromagnetic switches 310 are in electrical communication with the controlling device 300. The CPS also includes a sound device 312 in communication with the controlling device 300 and a mock stethoscope (activating device) 314 configured to activate at least one of the electromagnetic switches 310. When the mock stethoscope 314 is applied on the portion of the wall 12 of manikin 10, the mock stethoscope 314 interacts with at least one of the plurality of electromagnetic switches 310 to activate the sound device 312 to emit an audio signal selected from a library of audio signals saved in the memory 304 of the controlling device 300.

In an embodiment of the invention, the electromagnetic switches comprise magnetic reed switches. A reed switch is an electric switch which generally consists of a pair of ferrous metal contacts in a hermetically sealed glass envelope. A permanent magnet placed in close proximity to the switch will cause the ferrous metal contacts to pull together, thus completing an electrical circuit hence allowing an electrical signal to be transmitted therethrough.

The mock stethoscope 314 in the present case is different from a conventional medical stethoscope used for listening to internal sounds in the body. In the present case, the mock stethoscope 314 is provided with a magnet (e.g., a permanent magnet) so that the mock stethoscope 314 can interact with at least a portion of the reed switches 310 and allow an electrical signal to propagate to the controlling device 300 which activates the sound device 312. In an embodiment of the invention, the sound device 312 can be incorporated in the ear pieces of the mock stethoscope 314. In another embodiment, the sound device is separate from the mock stethoscope 314, for example, the sound device 312 may comprise a set of audio speakers to allow a plurality of students to listen to the audio signal. In an embodiment of the invention, the electromagnetic switches 310 are configured into a grid to cover substantially cardiac auscultatory areas which include aortic area (AOR) 36, pulmonary area (PUL) 38, tricuspid area (TA) 40, mitral area (MA) 42, mitral radiation area (MR) 44 and breathing pulmonary auscultation which include the right upper quadrant lung field (RUQ) 48A, the left upper lung quadrant lung field (LUQ) 48B, the right lower posterior lung field (RLP) 48C, right lower anterior lung field (RLA) 48D, the left lower posterior lung field (LLP) 48E and the left lower anterior lung field (LLA) 48F (shown in FIG. 1).

Figure 22:
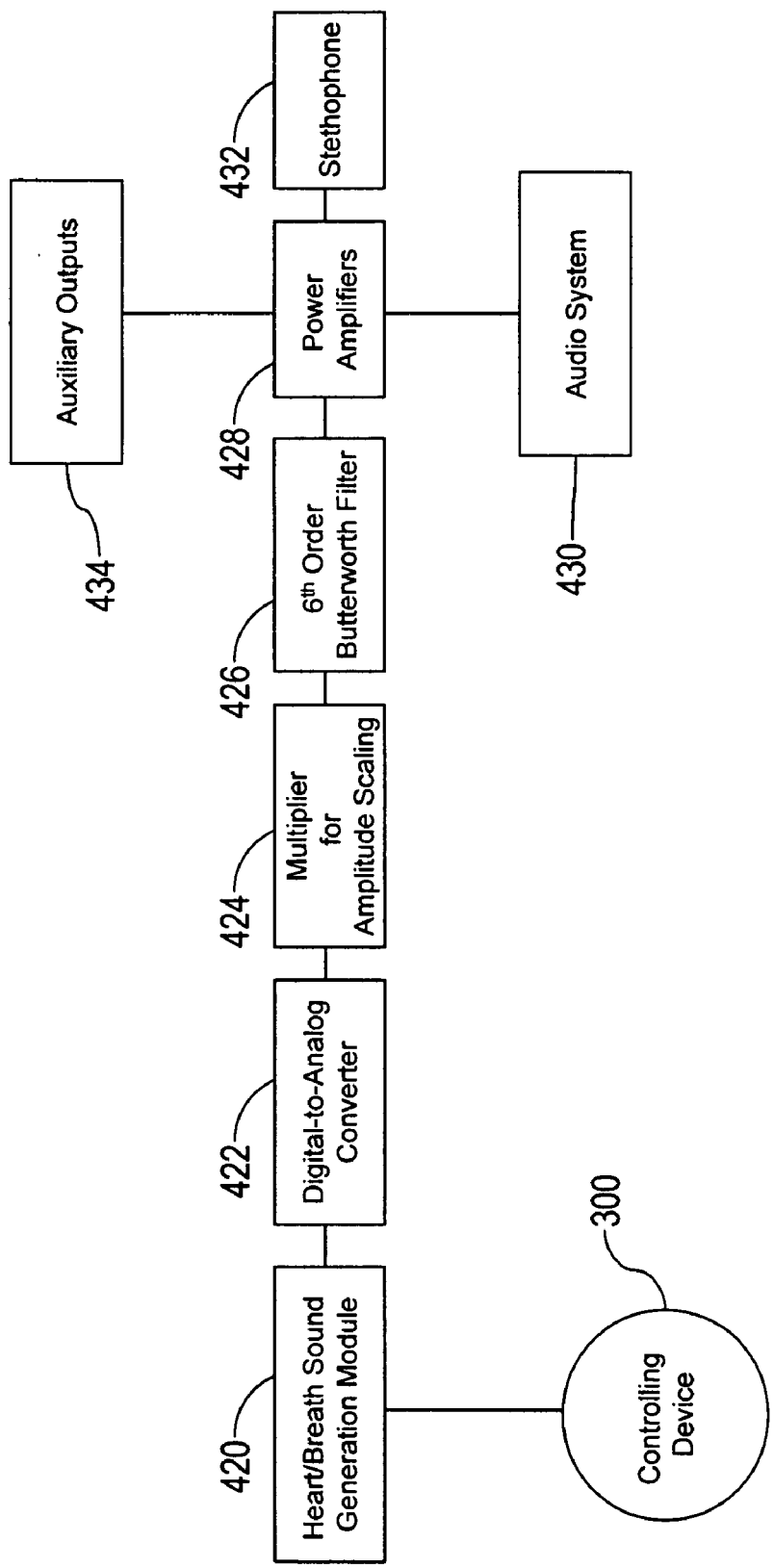
FIG. 22 is an electronic diagram of a chain of components used to control a sound device, according to an embodiment of the present invention.

FIG. 22 is an electronic diagram of a chain of components used to control the sound device 312, according to an embodiment of the present invention. The controlling device 300 sends an electric signal to a heart/breath sound generation module 420. The heart/breath sound generation module 420 is connected to a digital-to-analog converter 422 for converting the digital signal provided by the controlling device 300 into an analog signal. The analog signal is multiplied for amplitude scaling by multiplier 424. The amplitude scaled analog signal is sent to $6^{th}$ order Butterworth filter 426 for frequency filtering. The filtered analog signal is then sent to power amplifiers 428 for amplifying the power of the analog signal. The amplified signal is transferred to sound device 312. The sound device 312 may include, for example, an audio system 430 such as audio speakers which can be wired or wireless, earphones which can be wired or wireless, stethophones 432 and other auxiliary audio outputs 434. Stethophones 432 can be, for example, part of the mock stethoscope 314.

In an embodiment of the invention, each audio signal in the library of audio signals corresponds to one of a plurality of health conditions. In an embodiment of the invention, a frequency and/or amplitude of each audio signal in the library of audio signals correlates with a frequency and/or amplitude of each of the plurality of sets of electrical signals in a corresponding health condition in the plurality of health conditions. In an embodiment of the invention, a relationship between corresponding bilateral sounds of selected parts of the wall of the body is different from one health condition to another health condition in the plurality of health conditions. The audio signal includes, for example, a cardiovascular sound such as heart valve closure, breathing sounds, etc.

In an embodiment of the invention, an intensity of the audio signal is controllable relative to intensities of other sounds. For example, the intensity of the audio signal can be controllable such that the audio signal is discernible over ambient sounds.

In an embodiment of the invention, the mock stethoscope 314 interacts with one or a group in the plurality of electromagnetic switches 310 (for example reed switches) to activate the sound device 312 to emit one sound and interacts with another one or another group in the plurality of electromagnetic switches 310 to activate the sound device 312 to emit another sound which is different from the first mentioned sound.

The CPS includes an electromagnetic switch 310 (see FIG. 20) disposed inside the cavity 14 of the manikin 10. The electromagnetic switch 310, for example a reed switch, is positioned adjacent a portion of the wall of the arm 18 of manikin 10 (see FIG. 1). The electromagnetic switch 310 is in electrical communication with the controlling device 300.

Figure 23:
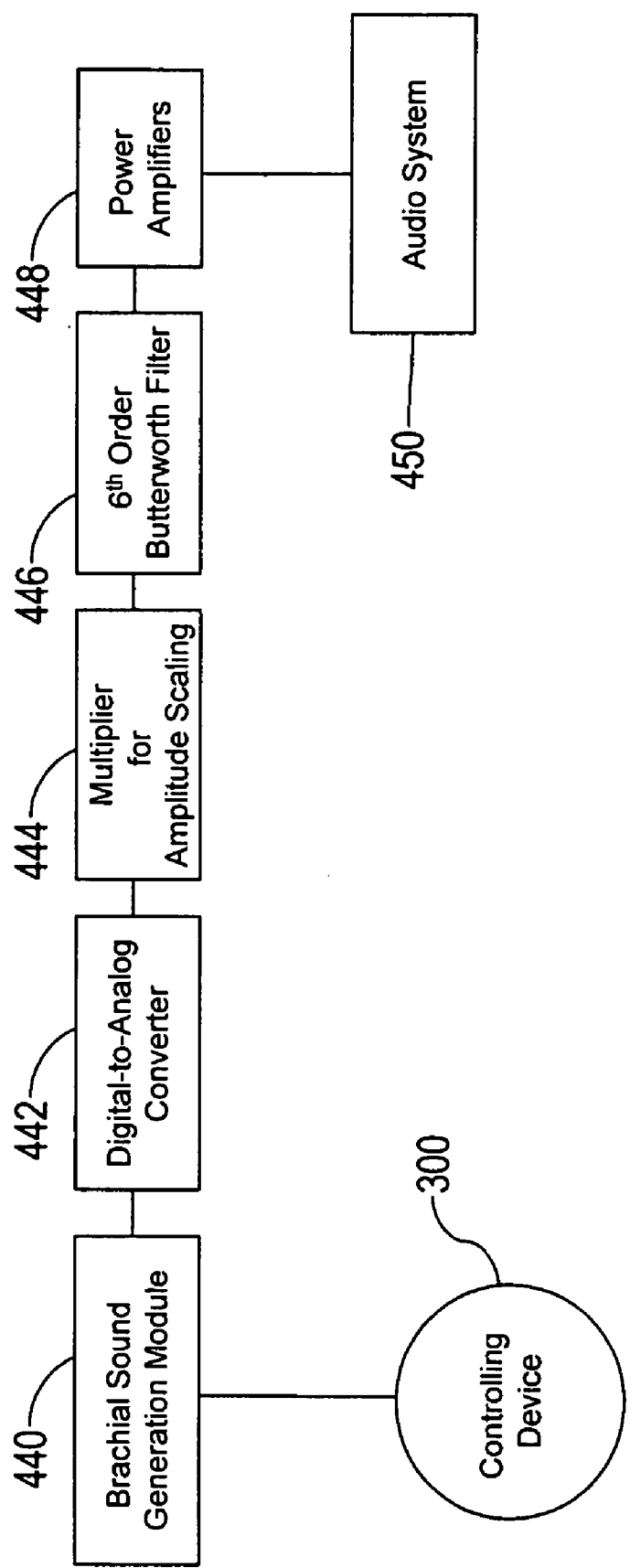
FIG. 23 is an electronic diagram of a chain of components used to control brachial sounds.

FIG. 23 is an electronic diagram of a chain of components used to control brachial sounds, according to an embodiment of the present invention. The controlling device 300 sends an electric signal to a brachial sound generation module 440. The brachial sound generation module 440 is connected to a digital-to-analog converter 442 for converting the digital signal provided by the controlling device 300 into an analog signal. The analog signal is multiplied for amplitude scaling by multiplier 444. The amplitude scaled analog signal is sent to $6^{th}$ order Butterworth filter 446 for frequency filtering. The filtered analog signal is then sent to power amplifiers 448 for amplifying the power of the analog signal. The amplified signal is transferred to sound device 312 (see FIG. 20). The sound device 312 may include for example an audio system 450 for generating brachial artery blood flow sounds.

The CPS further includes a cuff 320 (shown in FIG. 2) disposed around the arm 18 of manikin 10. The cuff 320 is provided with an inflating device 340 configured to inflate the cuff 320 around the arm 18. The inflating device is connected to a pressure sensor 321 connected to the controlling device 300 (see FIG. 20). The pressure sensor 321 can be disposed, for example, inside the housing of the table top 50. The pressure sensor 321 is configured to measure a pressure generated by the cuff 320.

In a real patient, the cuff is wrapped around the upper arm and is inflated to a pressure exceeding that of the brachial artery. This amount of pressure collapses the artery and stops the flow of blood to the arm. The pressure of the cuff is slowly reduced as the pressure in the cuff is monitored by a pressure transducer. As the pressure drops, it will eventually match the systolic (peak) arterial pressure. At this point, the blood is able to "squirt" through the brachial artery. This squirting results in turbulence which creates the Korotkoff sounds. The Korotkoff sounds are detected using a stethoscope, for example. As the cuff pressure continues to drop, the pressure will eventually match the diastolic pressure of the artery. At this point the Korotkoff sounds stop completely, because the blood is now flowing unrestricted through the artery.

In the case of the CPS, when the mock stethoscope 314 (see FIG. 20) is applied on the portion of the arm 18 where the electromagnetic switch 310 is disposed and when the pressure measured by the pressure sensor is above a first pressure (diastolic pressure) and below a second pressure (systolic pressure), the mock stethoscope 314 interacts with the electromagnetic switch 310 to activate the sound device 312 (for example, audio system 450 shown in FIG. 23 which, in one embodiment, may be in the ear pieces of the mock stethoscope 314) to emit an audio signal corresponding to Korotkoff sounds. When the pressure measured by the pressure sensor is above the second pressure (systolic pressure), the sound device does not emit Korotkoff sounds. When the pressure measured by the pressure sensor is below the first pressure (diastolic pressure), the sound device does not emit Korotkoff sounds. The diastolic and systolic pressures are selected according to preset health condition(s). The diastolic and systolic pressures are input into the CPS via user interface 303 and are saved in memory 304 of controlling device 300.

As stated above, the plurality of sets of electrical signals are generated by inputting a corresponding plurality of data sets via user interface 303, into a memory device 304 of the controlling device 300 and running a computer program using computer processing unit (CPU) 306 in the controlling device 300. The computer program comprises a set of instructions when executed by the CPU 306 generates the plurality of sets of electrical signals. Hence an aspect of the present invention is to provide a method for generating the set of electrical signals.

Figure 24:
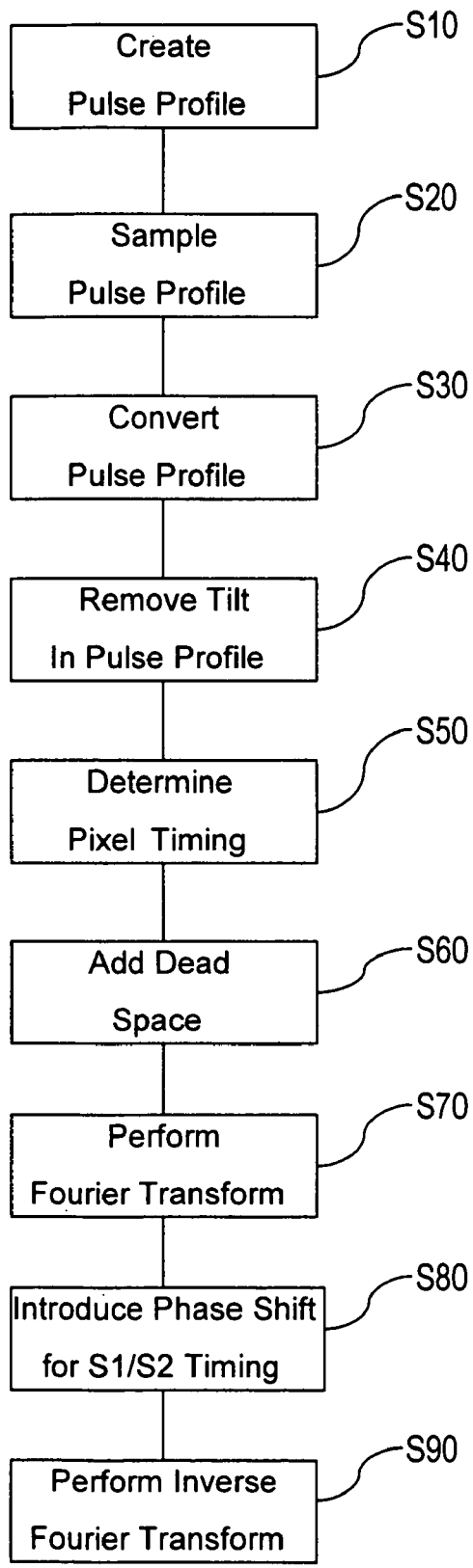
FIG. 24 is a flow chart illustrating a method for generating a set of electrical signals, according to an embodiment of the present invention.

In an embodiment of the invention, as illustrated in FIG. 24, the method comprises creating a pulse profile, at step S10, sampling the pulse profile, at step S20, and converting the pulse profile into a two dimensional data, at step S30. The method further includes removing any tilt so that a beginning and ending of the two dimensional data are flat, at step S40 and determining pixel to timing conversion based on timing data using first heart sound time location S1 and second heart sound time location S2, at step S50. The method further includes adding dead space (a time interval with zero amplitude) to the beginning and end of the two dimensional data and, for example, making a period of the two dimensional data approximately one second and normalizing an amplitude of the two dimensional data, at step S60. The method progresses by performing a Fourier transform and transforming the two dimensional data to a Fourier series at get into the frequency domain, at step S70 followed by introducing a phase shift for S1/S2 such that the first and second heart sounds S1 and S2 are timed properly, at step S80. Specifically, the timing of the CPS is shifted so that S1 occurs at 0. The method further includes performing an inverse Fourier transform, to get back to the time domain, for example, every 0.5 ms at 2 KHz sampling rate and normalize again, for example, to 12-bit scale of 0 to 4095.

The pulse profile can be generated, for example, by drawing on a sheet of paper and scanning the drawing in the sheet of paper and saving the drawing as an image file, for example as a bit-map (BMP) file. The profile may also be generated by drawing a pulse profile on an electronic tablet linked to a computer and thus directly saving the drawing as a data file, e.g. a BMP file. By using this method a medical doctor can create any pulse shape and thus provide various sets of health conditions to the CPS.

Figure 25:
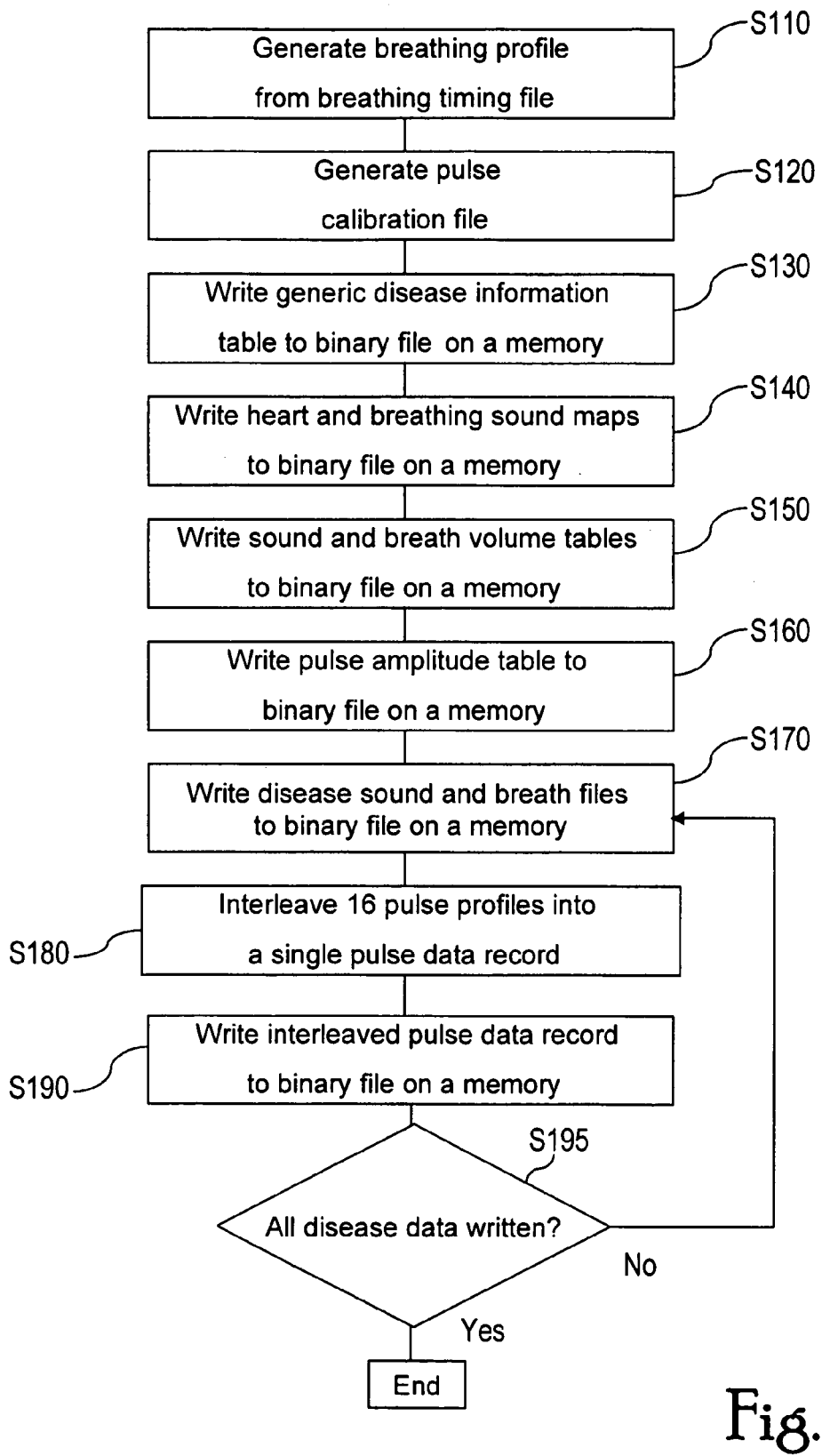
FIG. 25 is a flow chart illustrating a method for generating a breathing movement, according to an embodiment of the present invention.
Figure 26:
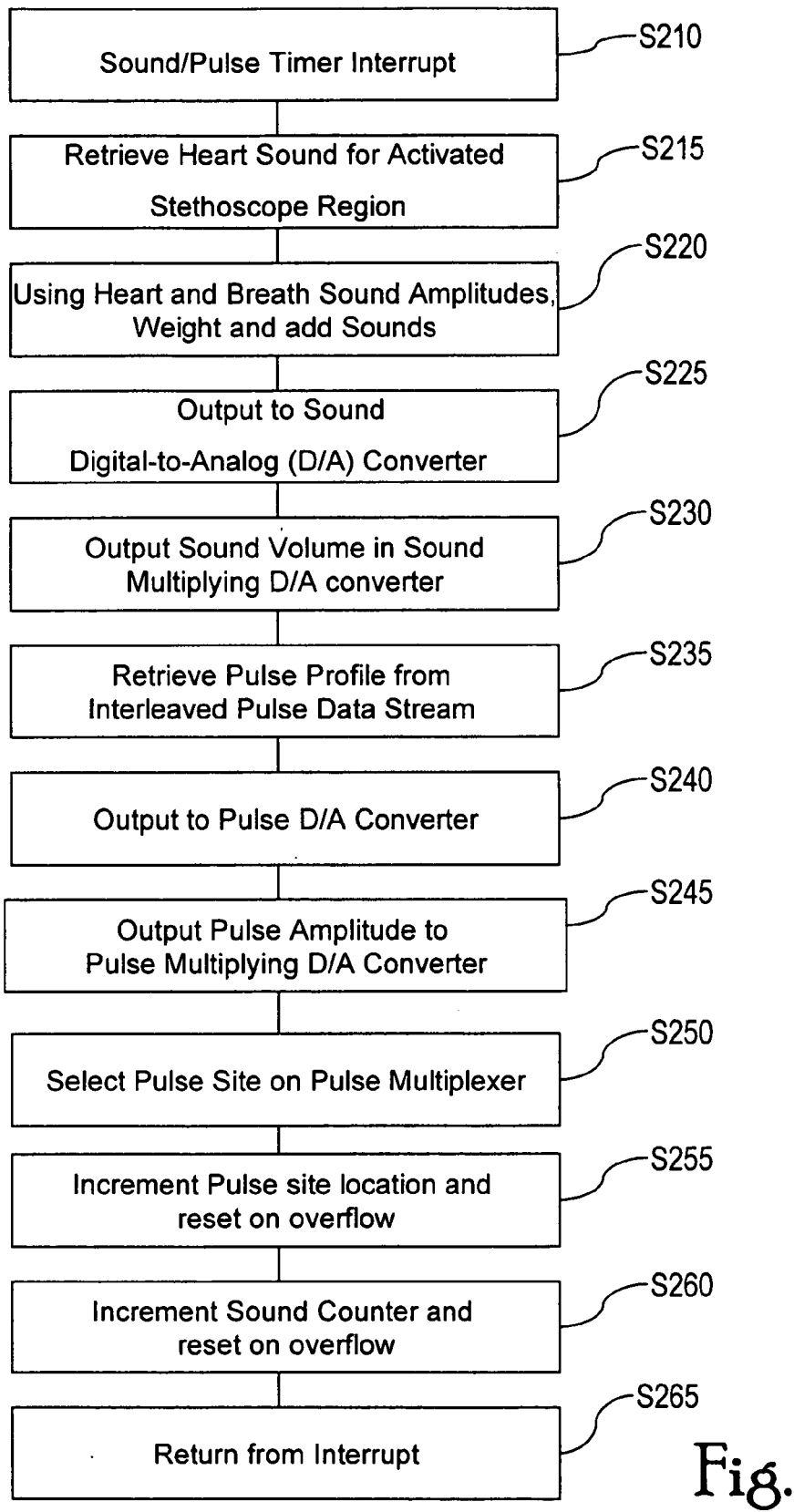
FIG. 26 is a flow chart illustrating a method for generating a pulse and a sound and coordinating and/or synchronizing between the pulse and the sound, according to an embodiment of the present invention.

A further aspect of the present invention is to provide a method for generating breathing movement. In an embodiment of the invention, as illustrated in FIG. 25, the method includes generating a breathing profile from a breathing timing file, at step S110, generating pulse calibration files, at step S120. In one embodiment, the breathing rate is set at 5 seconds. However, the breathing rate may be set to any rate. The method progresses by writing generic disease information table into a binary file on a memory, at step S130, writing heart and breathing sound maps to a binary file on a memory, at step S140, and writing pulse sound and breathing volume tables to a binary file on a memory, at step S150. In an embodiment of the invention, the heart pulses are synchronized with the heart sounds. The method further includes writing pulse amplitude table to a binary file on a memory, at step S160, and writing disease sound and breath files to a binary file on a memory, at step S170. The method further includes, interleaving the pulse profiles (for example 16 pulse profiles) into a single pulse data record, at step S180 and write interleaved pulse data record to binary file on a memory, at step S190. At this stage, a test is performed to determine if all disease data are written, at step S200. If all diseases data is written then the method ends. If all the disease data is not written, then there the method repeats starting at step S170.

The cardiovascular (e.g. heart) sounds and breathing sounds are recorded and gathered in a database for building a library of sounds for various health conditions and at various locations in a body of one or more patients. In addition or alternatively, some or all the sounds (breathing sounds or cardiovascular sounds) may also be synthesized, i.e. not recorded from a real patient. The sounds may be synthesized using one or more sound generating devices. The sounds can be synchronized with the pulse (e.g. heart beat) by timing S1 and S2 relative to the "S1 and S2" of the sounds. In other words, S1 and S2 are used as references in the generation of a breathing and/or heart sound.

Therefore, a further aspect of the present invention is to provide a method for generating a pulse and a sound and coordinating and/or synchronizing between the pulse and the sound within the CPS. In an embodiment of the invention, the method includes providing an interrupt timer within CPU 306 for generating the sound and/or pulse, at step S210. In this embodiment, this occurs every 0.5 msec., but the timing can be varied. The method further includes retrieving a heart sound for an activated stethoscope region, at step S215, and weighing and adding sounds using heart and breathing sound amplitudes, at step S220. The method progresses by outputting to sound digital-to-analog (D/A) converter, at step S225 and outputting sound volume in sound multiplying D/A converter, at step S230.

The method further includes retrieving a pulse profile from an interleaved pulse data stream, at step S235, outputting to pulse D/A converter, at step S240, and outputting pulse amplitude to pulse multiplying D/A converter, at step S245. The method further includes selecting a pulse site on a pulse multiplexer, at step S250. Following selecting the pulse site, incrementing a location of the pulse site and reset to overflow, at step S255 and incrementing the sound counter and reset to overflow, at step 260. The method may then repeat by returning to step S210 and starting the timer.

The pulses, i.e. the pulse wave forms, are sampled at 2 kilohertz but in reality each pulse is only sampled at one sixteenth (1/16) of that. So every time a sound is generated one of sixteen possible pulses is sampled. Each pulse is 0.5 ms in duration and one pulse occurs every 8 ms. However, if one pulse occurs every 8 ms, that translates into a 125 Hz signal. The actual bandwidth of the pulse signal itself is only 20 hertz. To be accurate, i.e. within Nyquist criterion, the signal would need to be sampled at a frequency of 40 hertz. So there is a margin of three higher.

Figure 27:
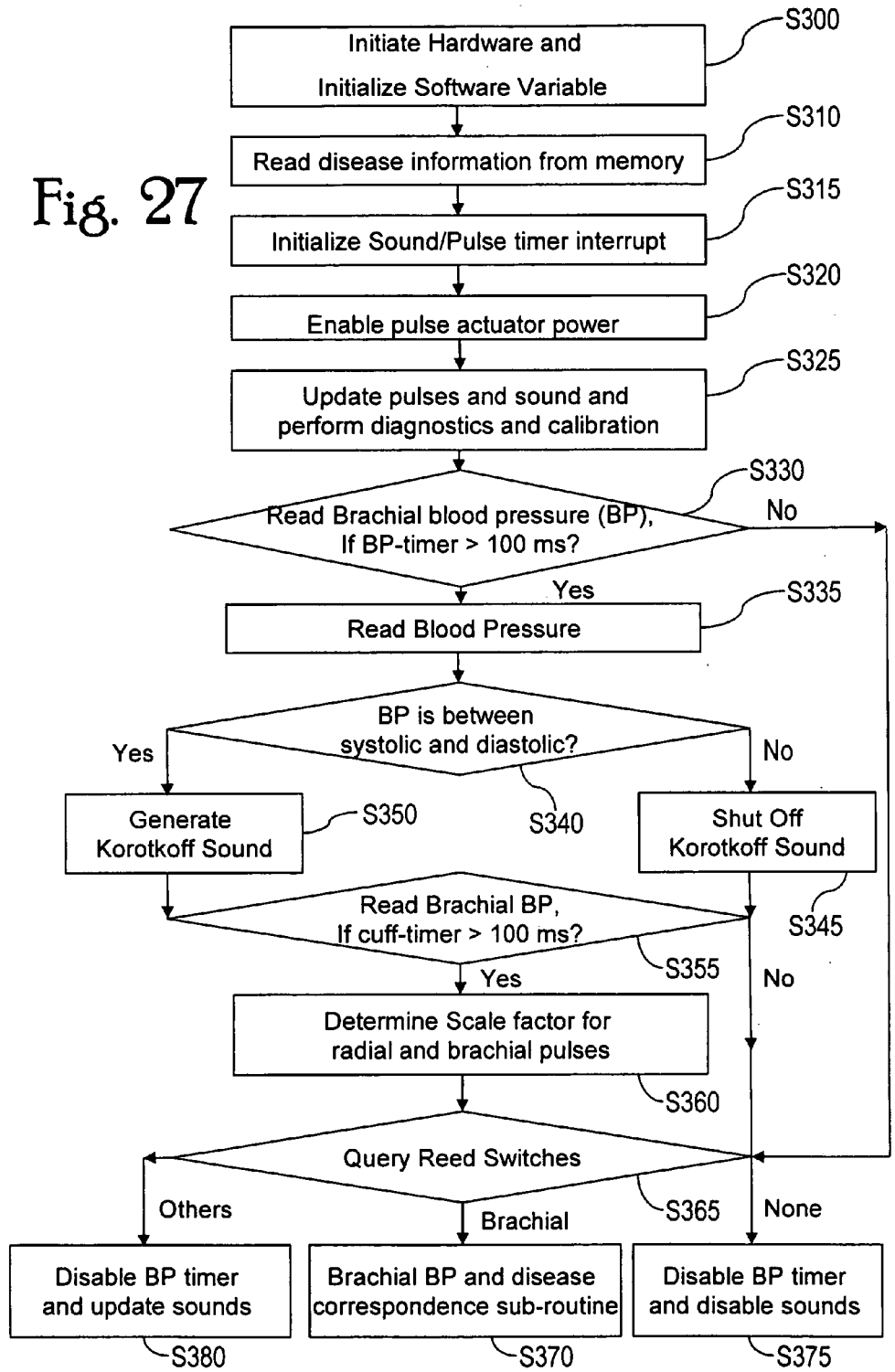
FIG. 27 is a flow chart illustrating a method for controlling a controlling device and generating and/or timing various pulses and/or sounds, according to an embodiment of the present invention.

A further aspect of the present invention, is to provide a method controlling the control device and generating and/or timing various pulses and/or sounds in various areas of the CPS. In an embodiment of the invention, the method includes initiating CPU 306 of the CPS and initiating all software variables at step S300 as illustrated in FIG. 27, and reading disease information from memory 304 or other memory in communication with to CPU 306 at step S310. For example, at least two diseases can be loaded in buffers 308 so as to be accessible at any time during the progress of the method.

The method further includes initializing the sound and/or pulse timer interrupt, at step S315 and enabling pulse actuator power, at step 320. The method progresses by updating pulse and sound and perform diagnostic and calibration, at step S325 and testing if brachial blood pressure timer is greater than 100 ms. If the timer is greater than 100 ms, the brachial blood pressure (BP) is read, at step S335. If the timer is less than 100 ms, the reed switches are queried at step S365. When the brachial blood pressure is read at step S335, the method progresses by performing another test at step S340 to determine if the brachial blood pressure is between the systolic and diastolic blood pressure. If the brachial pressure is between the systolic and diastolic pressure, the controlling device 300 controls the sound device 312 to generate the Korotkoff sounds, at step S350. If the blood pressure is not between the systolic and diastolic pressure (for example higher than the systolic pressure or lower than the diastolic pressure), the controlling device 300 shuts off the Korotkoff sounds.

The method further includes inquiring if the cuff-timer is greater than 100 ms, at step S355. If the cuff-timer is greater than 100 ms, the scale factor for the radial and brachial pulses is determined and re-initialize the cuff-timer, at step S360. If the cuff-timer is less than 100 ms, the method progresses by querying the switches (e.g. Reed switches), at step S365. After determining the scale factor for the radial and brachial pulses, at step S360, the method also progresses by querying the switches, at step S365. At step S365 a determination is made as to the status of the reed switches. If the brachial switch is activated, i.e. the stethoscope is on the brachial, the method progresses by performing a subroutine, at step S370, to determine a brachial blood pressure and disease correspondence which includes starting the blood pressure timer and which will be discussed in more detail in the following paragraphs. If none of the switches is activated the blood pressure timer is disabled and the sounds are disabled, at step S375. For example, if the stethoscope is anywhere but in the right brachial, the blood pressure timer is disabled and the sounds are disabled. If other switches except the brachial switch, are activated, the blood pressure timer is disabled and the sounds are updated, at step S380. The sounds are updated by tracking where the stethoscope is positioned, i.e., which switch is activated by the stethoscope, and updating the sound data value. For example, the sound data value is updated if the stethoscope moves from the aortic to the pulmonary so that the sound value corresponds to the pulmonary.

Figure 28:
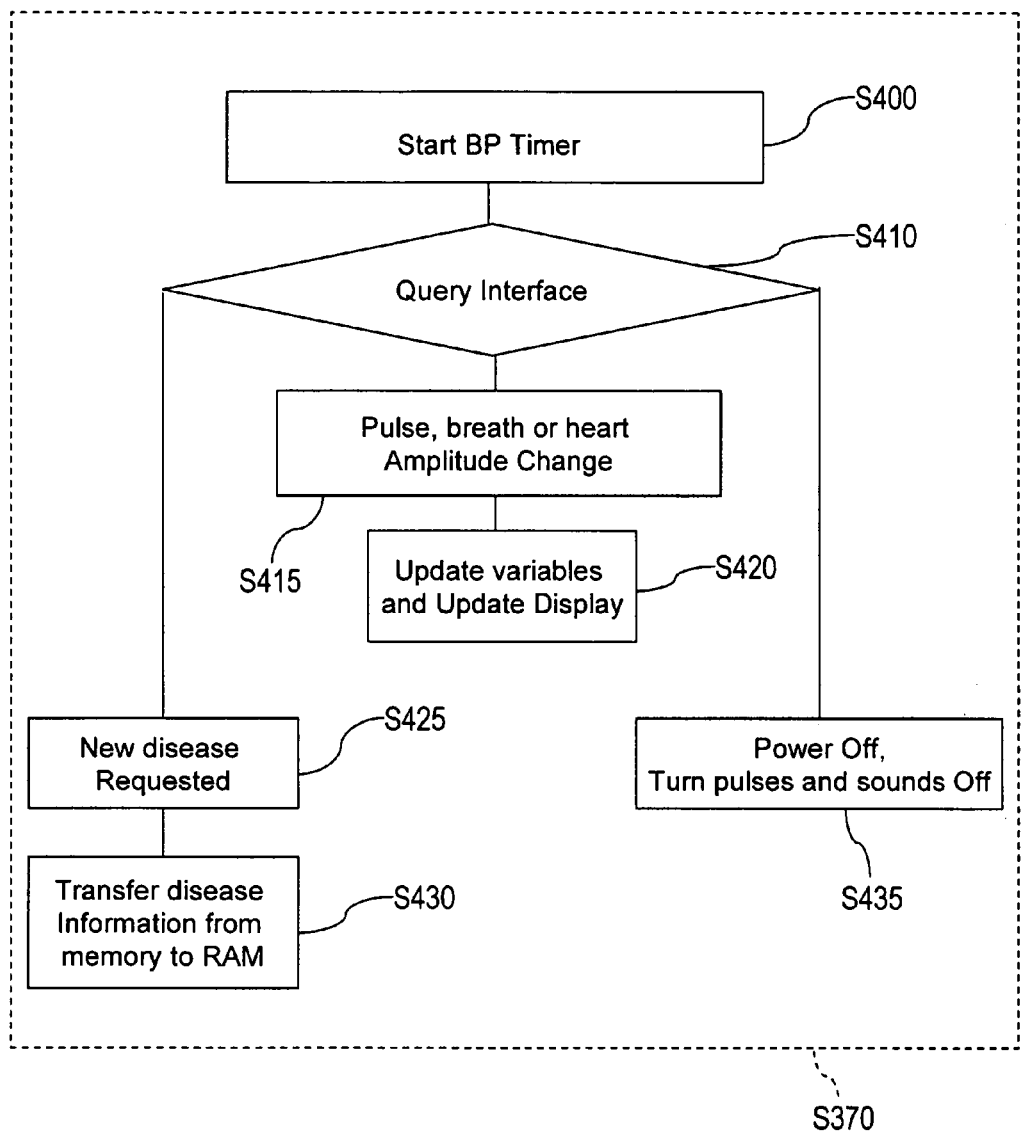
FIG. 28 is a flow chart illustrating a subroutine in the method illustrated in FIG. 27, according to an embodiment of the present invention.

In an embodiment of the invention, the subroutine S370 of the above method, includes the starting the blood pressure timer, at step S400 (see FIG. 28) and querying the interface 52 (see FIG. 2). If the amplitude of the breath, pulse or heart are changed, at step S415, the method progresses by updating variable and updating the display in interface 52, at step S420. If a new disease is entered via interface 52 in FIG. 2, the information about the requested disease is transferred from the memory to the RAM of the controlling device 300. If on the other hand a power off command is entered, the controlling device powers off and thus pulses and sounds are turned off.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments.

Moreover, the method and apparatus of the present invention, like related apparatus and methods used in robotic or simulation arts are complex in nature, are often best practiced by empirically determining the appropriate values of the operating parameters, or by conducting computer simulations to arrive at best design for a given application. Accordingly, all suitable modifications and equivalents should be considered as falling within the spirit and scope of the invention.

In addition, it should be understood that the figures, are presented for example purposes only. The architecture of the present invention is sufficiently flexible and configurable, such that it may be utilized in ways other than that shown in the accompanying figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

What is claimed:

1. A simulator for simulating a pulse in a manikin, comprising:
   a manikin body;
   a first magnet and a second magnet disposed opposite to each other and spaced apart from each other, the first magnet and second magnet comprising two juxtaposed first and second sub-magnets, the first and second juxtaposed sub-magnets in each magnet being oriented substantially in opposite directions, wherein the first magnet and the second magnet are positioned such that the first sub-magnet of the first magnet is oriented substantially in a same direction as the first sub-magnet of the second magnet and such that the second sub-magnet of the first magnet is oriented substantially in a same direction as the second sub-magnet of the second magnet;
   an armature movably disposed between the first and second magnets, the armature comprising a frame and a solenoid wound adjacent a periphery of the frame; and
   a rod attached to the frame of the armature,
   wherein the armature interacts with the manikin body for simulating the pulse.

2. The simulator according to claim 1, wherein a resultant magnetic field between the first sub-magnet of the first magnet and the first sub-magnet of the second magnet is oriented in opposite direction to a resultant magnetic field between the second sub-magnet of the first magnet and the second sub-magnet of the second magnet.

3. The simulator according to claim 2, wherein when the solenoid is energized by a current, the current produces an electromagnetic field in the solenoid that interacts with the resultant magnetic field between the first sub-magnets of the first magnet and second magnet and interacts with the resultant magnetic field between the second sub-magnets of the first and second magnets to generate a force that moves the armature.

4. The simulator according to claim 3, wherein the generated force is substantially perpendicular to the electromagnetic field.

5. The simulator according to claim 3, wherein the electromagnetic field in the solenoid interacts with the resultant magnetic field between the first sub-magnets of the first and second magnets to generate a first force component and interacts with the resultant magnetic field between the second sub-magnets of the first and second magnets to generate a second force component, said second force component adding to said first force component to form the force that moves the armature.

6. The simulator according to claim 1, further comprising:
   a first and a second plate spaced apart from each other; and
   a plurality of elongated elements configured to hold said first plate and said second plate,
   wherein said first and second magnets are disposed between said first and second plates.

7. The simulator according to claim 6, wherein said armature is movably mounted on said plurality of elongated elements between said first and second plates.

8. The simulator according to claim 6, wherein the rod extends through an opening in the second plate.

9. The simulator according to claim 8, further comprising a resilient member disposed around the rod between the second plate and the frame of the armature.

10. The simulator according to claim 9, wherein said resilient member biases the frame of the armature toward the first plate.

11. The simulator according to claim 9, further comprising another resilient member disposed around the rod between the second plate and a stop coupled to the rod.

12. The simulator according to claim 10, wherein said other resilient member biases the frame of the armature toward the second plate.

13. The simulator according to claim 12, wherein said first mentioned resilient member and said other resilient member are configured and arranged to maintain the armature at a neutral position when the solenoid is not energized.

14. The simulator according to claim 1, further comprising a bumper member disposed at an extremity of the rod.

15. The simulator according to claim 14, wherein said bumper member is positioned against a flexible material simulating a tissue of body such that when said linear transducer is energized said rod moves said flexible material to simulate cardiovascular pulses.

16. The simulator according to claim 1, wherein the first and second magnets are permanent magnets.

17. The simulator according to claim 1, wherein the frame of the armature is formed from a plastic.

18. The simulator according to claim 1, wherein the armature has a U-like shape and the rod is mounted on a base of the U-like shape.

19. The simulator according to claim 1, further comprising:
   a first and a second plate spaced apart from each other;
   a plurality of elongated elements configured to hold said first plate and said second plate; and
   magnet backing plates configured to complete the magnetic field between the first and second juxtaposed sub-magnets in each magnet.

20. The simulator according to claim 19, wherein the magnet backing plates are configured to hold the first and second juxtaposed sub-magnets in each magnet.

21. The simulator according to claim 19, wherein the magnet backing plates are formed of nickel plated steel.

22. The simulator according to claim 19, wherein the first and second plates are made of aluminum.

* * * * *